United States Patent
Dragojlov et al.

(10) Patent No.: US 12,338,915 B2
(45) Date of Patent: Jun. 24, 2025

(54) COOLANT FLOW CONTROL VALVE SEAL ASSEMBLY

(71) Applicant: Vitesco Technologies USA, LLC, Auburn Hills, MI (US)

(72) Inventors: Alexander Dragojlov, Chatham (CA); Jörg Eissler, Wiesbaden (DE); Ravinder Singh Gill, Chatham (CA); Benjamin MacNally, Chatham (CA); Jeremy Daniel Schmidt, Chatham (CA)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 199 days.

(21) Appl. No.: 18/178,999

(22) Filed: Mar. 6, 2023

(65) Prior Publication Data
US 2023/0279954 A1 Sep. 7, 2023

Related U.S. Application Data

(60) Provisional application No. 63/268,973, filed on Mar. 7, 2022.

(51) Int. Cl.
*F16K 5/04* (2006.01)
*F16K 11/08* (2006.01)
*F16K 11/085* (2006.01)

(52) U.S. Cl.
CPC .......... *F16K 5/0471* (2013.01); *F16K 5/0478* (2013.01); *F16K 11/0856* (2013.01)

(58) Field of Classification Search
CPC .............................. F16K 5/0471; F16L 1/0856
See application file for complete search history.

(56) References Cited

U.S. PATENT DOCUMENTS

| | | | | |
|---|---|---|---|---|
| 4,397,446 A | * | 8/1983 | Jelinek | F16K 5/0471 251/317 |
| 4,702,205 A | * | 10/1987 | David | F01C 21/0863 418/268 |
| 5,992,371 A | * | 11/1999 | Raso | F01C 1/073 418/33 |
| 10,344,877 B2 | | 7/2019 | Roche | |
| 2010/0187920 A1 | * | 7/2010 | Best | H02K 11/33 310/43 |

(Continued)

OTHER PUBLICATIONS

International Search Report and Written Opinion dated Jun. 28, 2023 from corresponding International Patent Application No. PCT/US2023/063844.

*Primary Examiner* — Kevin R Barss

(57) ABSTRACT

A seal assembly for a multi-port valve assembly, the seal assembly including a plurality of beads integrally formed as part of a rotor, at least one seal element in sliding contact with one or more of the beads, and at least one lip seal integrally formed as part of the seal element. One or more of the beads applies force to the seal element, such that the force is transferred to the lip seal. The beads include at least one circumferential bead which circumscribes the rotor, and the circumferential bead continuously applies force to the seal element when the rotor is in each of a plurality of orientations. The beads also include at least one tangential bead extending along an outer surface of the rotor, and the tangential bead applies force to the seal element when the rotor is in one of a plurality of orientations.

31 Claims, 22 Drawing Sheets

(56) References Cited

U.S. PATENT DOCUMENTS

| | | | |
|---|---|---|---|
| 2011/0109047 A1* | 5/2011 | Tones | F16J 15/3244 |
| | | | 277/412 |
| 2017/0237312 A1* | 8/2017 | Stewart | H02K 11/33 |
| | | | 310/68 B |
| 2022/0065356 A1 | 3/2022 | Graichen | |
| 2022/0314735 A1 | 10/2022 | Pinto | |

* cited by examiner

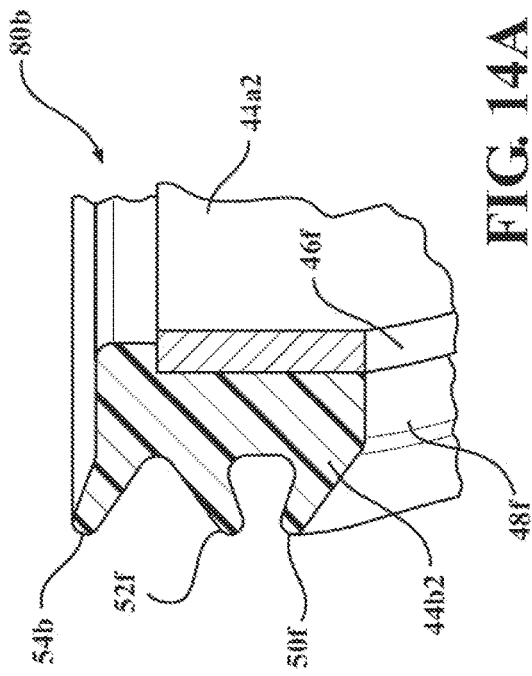
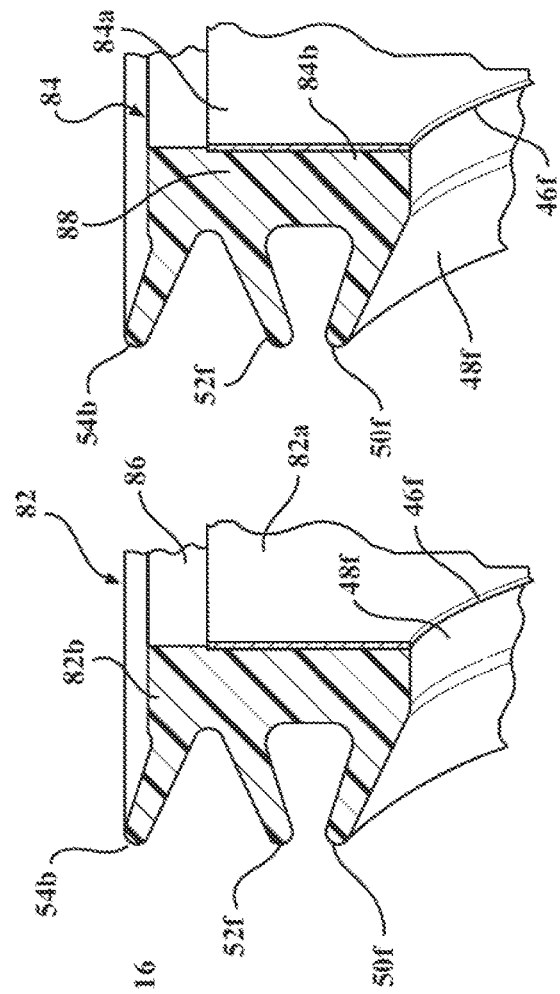
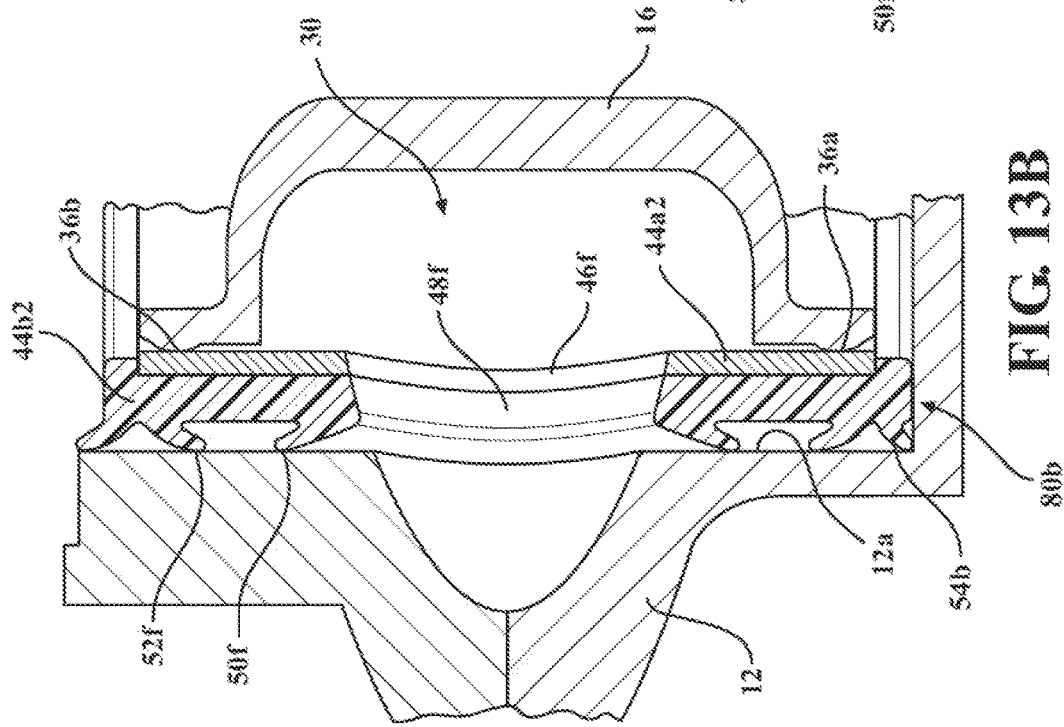

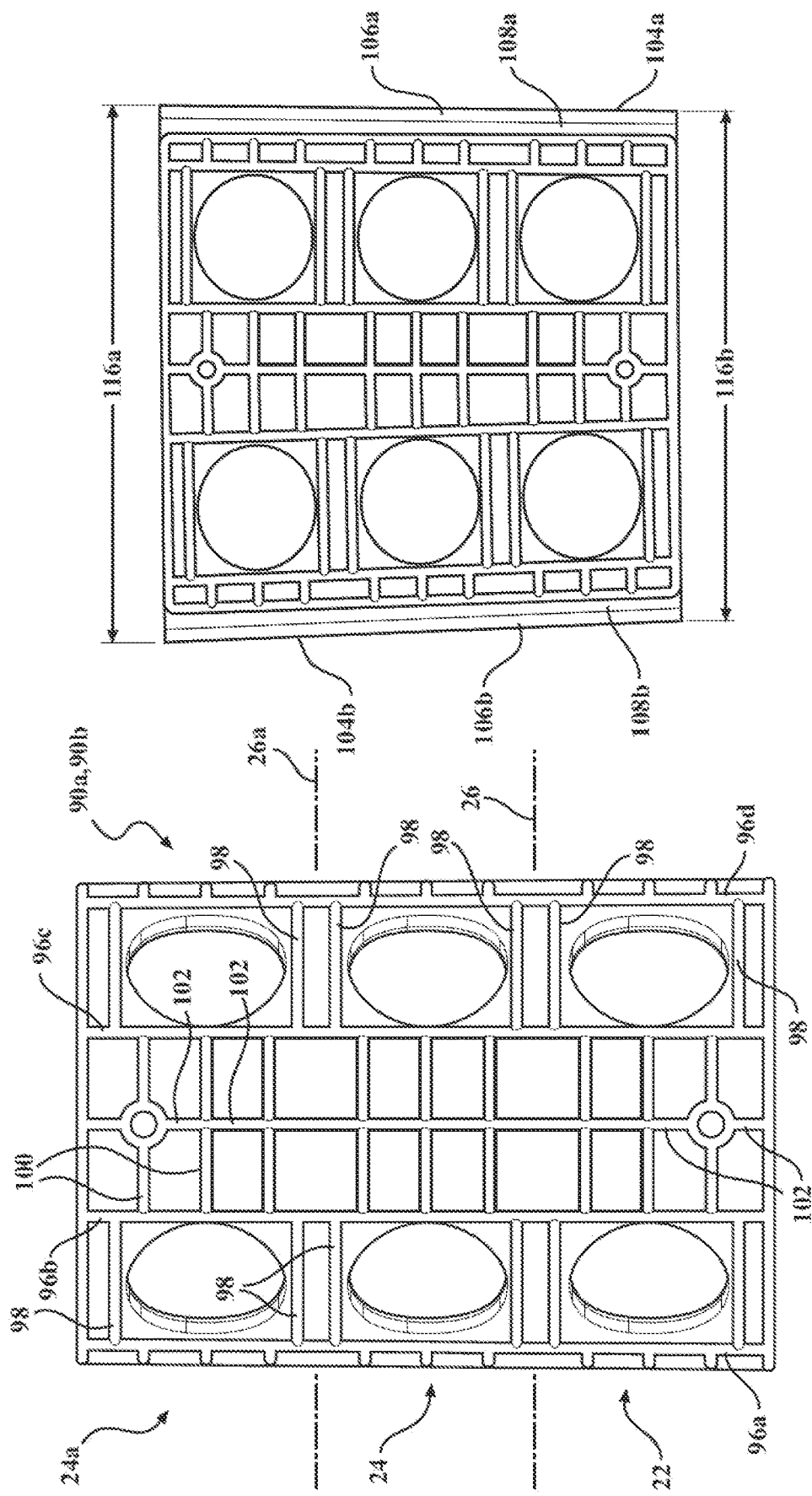

COOLANT FLOW CONTROL VALVE SEAL ASSEMBLY

CROSS-REFERENCE TO RELATED APPLICATIONS

This application claims the benefit of provisional application 63/268,973, filed Mar. 7, 2022. The disclosure of the above application is incorporated herein by reference.

FIELD OF THE INVENTION

The invention relates generally to a seal assembly for multi-port coolant flow control valve which includes a seal element having at least one sleeve, where the sleeve is located inside the cavity of a housing such that the seal element is located between an inner surface of the housing and a rotor, and the rotor includes one or more beads which apply force to an inner surface of the seal element, compressing the seal element between the inner surface of the housing and the bead to achieve the desired sealing when the rotor is placed in one of a plurality of orientations.

BACKGROUND OF THE INVENTION

Multi-port valves for directing fluid through various conduits are generally known. Some of the more common types of valves are a three-port valve and a four-port valve, where a single valve member is used to direct fluid from an inlet port to one of several outlet ports. Some multi-port valves include a five-port orientation, where multiple actuators are used to change the orientation of the valve to direct the flow of fluid as desired. There are also manifold style valves having up to eight ports are available but offer very little flexibility to accommodate different flow modes and different flow paths.

These current designs also have limitations with regard to sealing flexibility, which results in limitations for flow path design and efficiency.

Accordingly, there exists a need for a multi-port valve assembly which includes sealing to provide for efficiency that facilitates desired flow paths, and minimizes leakage.

SUMMARY OF THE INVENTION

In an embodiment, the present invention is a coolant flow control valve (CFCV) which includes an actuator which is used to rotate a rotor to one or more positions, and thus direct coolant (passing through the rotor) between ports. The rotor is rotated to different positions to create various flow paths, such that coolant is directed between the different flow paths.

In an embodiment, the present invention is a seal assembly for a multi-port valve assembly, the seal assembly including a plurality of beads integrally formed as part of a rotor, at least one seal element in sliding contact with one or more of the plurality of beads, and at least one lip seal integrally formed as part of the seal element. One or more of the beads applies force to the seal element, such that the force is transferred to the lip seal.

In an embodiment, the lip seal is at least one circular lip seal circumscribing an aperture integrally formed as part of the seal element, and the force applied to the seal element by one of the beads is also applied to the circular lip seal when the rotor is in one of a plurality of orientations.

In an embodiment, the lip seal is at least one quadrant lip seal circumscribing the circular lip seal, and the force applied to the seal element by one of the beads is also applied to the quadrant lip seal when the rotor is in one of a plurality of orientations.

In an embodiment, the lip seal is a circumferential lip seal located along an outer periphery of the seal element, and the force applied to the seal element by the bead is also applied to the circumferential lip seal when the rotor is in one of a plurality of orientations.

In an embodiment, the beads include at least one circumferential bead which circumscribes the rotor, and the circumferential bead continuously applies force to the seal element when the rotor is in each of a plurality of orientations.

In an embodiment, the beads include at least one tangential bead extending along an outer surface of the rotor, and the tangential bead applies force to the seal element when the rotor is in one of a plurality of orientations.

In an embodiment, the tangential bead includes a plurality of tangential beads, and a first two of the plurality of tangential beads have a first circumferential spacing, and a second two of the plurality of tangential beads have a second circumferential spacing.

In an embodiment, the seal element includes an inner sleeve having at least one aperture, each of the beads in contact with the inner sleeve, and an outer sleeve connected to the inner sleeve, and the outer sleeve having at least one aperture aligned with the aperture of the inner sleeve, where the lip seal is formed as part of the outer sleeve.

In an embodiment, a plane extends through the rotor, a first level is on one side of the plane, and a second level on the opposite side of the plane in relation to the first level. A portion of the beads is integrally formed as a part of the rotor which is located on the first level, and a portion of the beads is integrally formed as a part of the rotor which is located on the second level.

In an embodiment, the beads include at least one circumferential bead located in the plane, and a plurality of tangential beads integrally formed with the circumferential bead. A portion of the tangential beads are integrally formed as a part of the rotor which is located on the first level, and a portion of the tangential beads are integrally formed as a part of the rotor which is located on the second level.

In an embodiment, a portion of the seal element is located in the first level, and another portion of the seal element is located in the second level.

In an embodiment, the seal element is a plurality of seal elements, where one of the seal elements is located in the first level, and another of the seal elements is located in the second level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13B is a third sectional view of a third alternate embodiment of a coolant flow control valve having a seal assembly, according to embodiments of the present invention;

FIG. 14A is a partial sectional view of a third alternate embodiment of a seal element of a coolant flow control valve having a seal assembly, according to embodiments of the present invention;

FIG. 14B is a partial sectional view of a fourth alternate embodiment of a seal element of a coolant flow control valve having a seal assembly, according to embodiments of the present invention;

FIG. 14C is a partial sectional view of a fifth alternate embodiment of a seal element of a coolant flow control valve having a seal assembly, according to embodiments of the present invention;

FIG. 15C is a side view of a first seal element which is part of a sixth alternate embodiment of a coolant flow control valve having a seal assembly, according to embodiments of the present invention;

FIG. 15D is a side view of a first seal element, in a flattened position, which is part of a sixth alternate embodiment of a coolant flow control valve having a seal assembly, according to embodiments of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
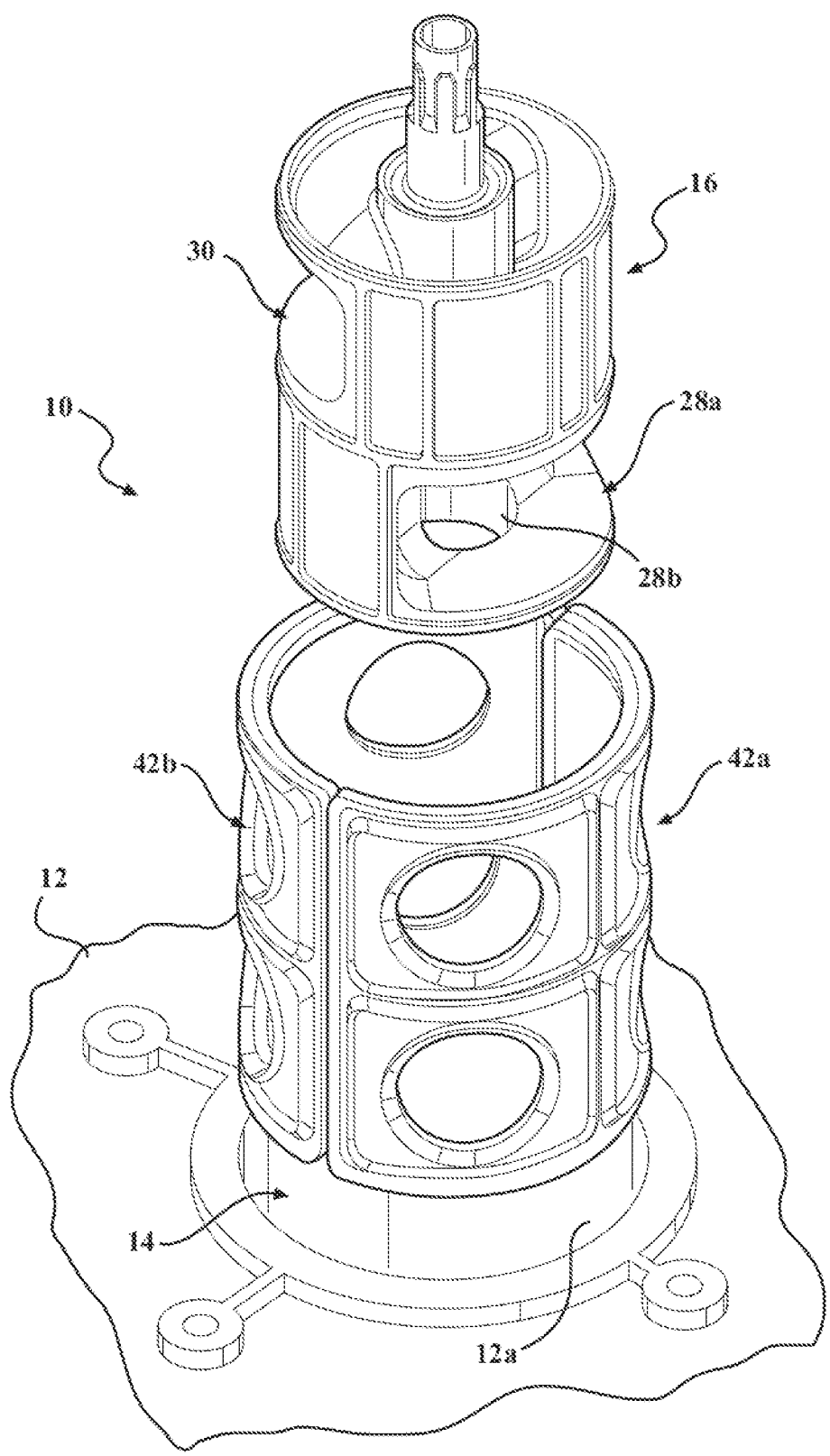
FIG. 1 is an exploded view of a coolant flow control valve having a seal assembly, according to embodiments of the present invention.
Figure 2A:
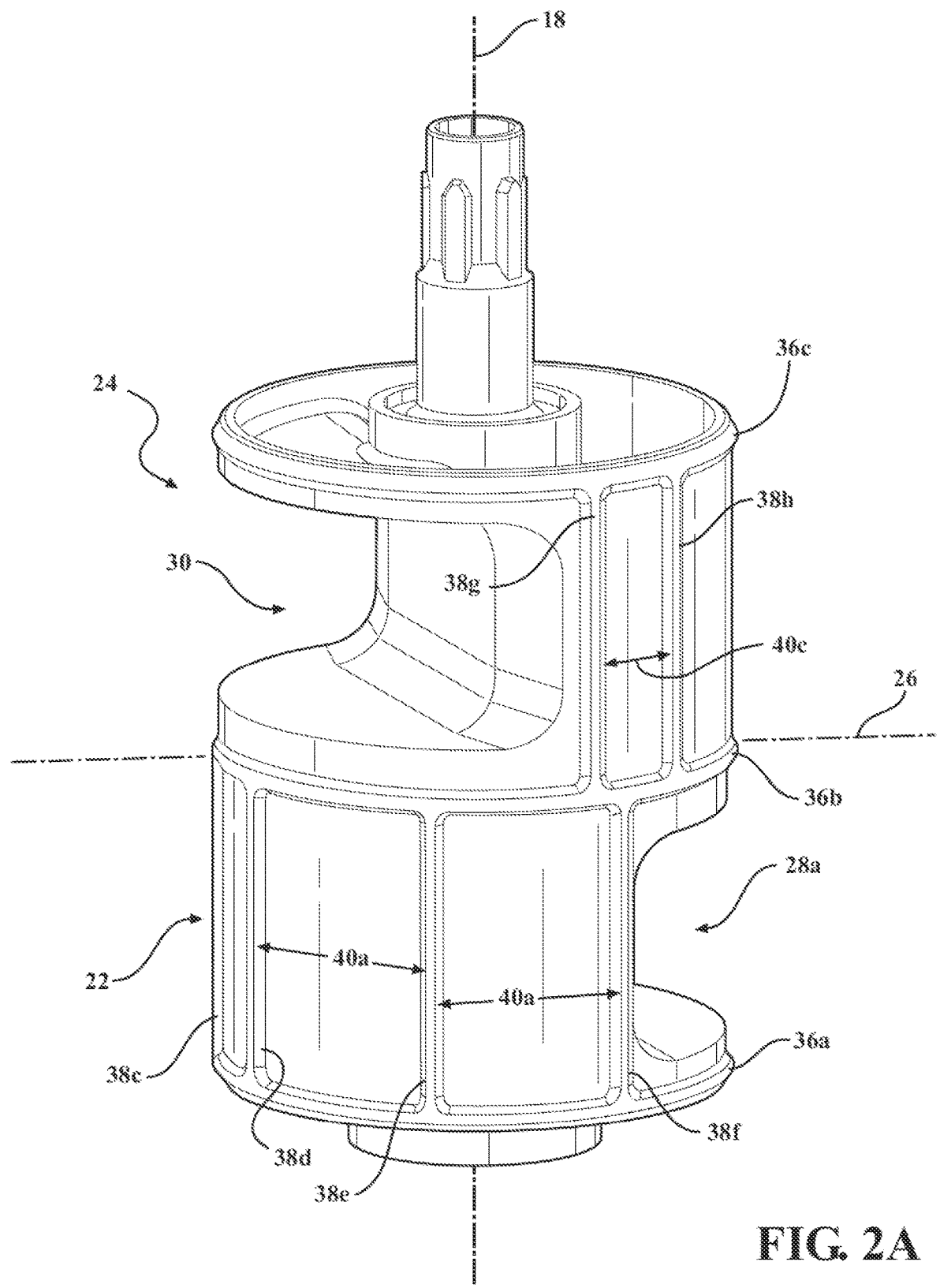
FIG. 2A a first perspective view of a rotor used as part of a coolant flow control valve having a seal assembly, according to embodiments of the present invention.
Figure 2B:
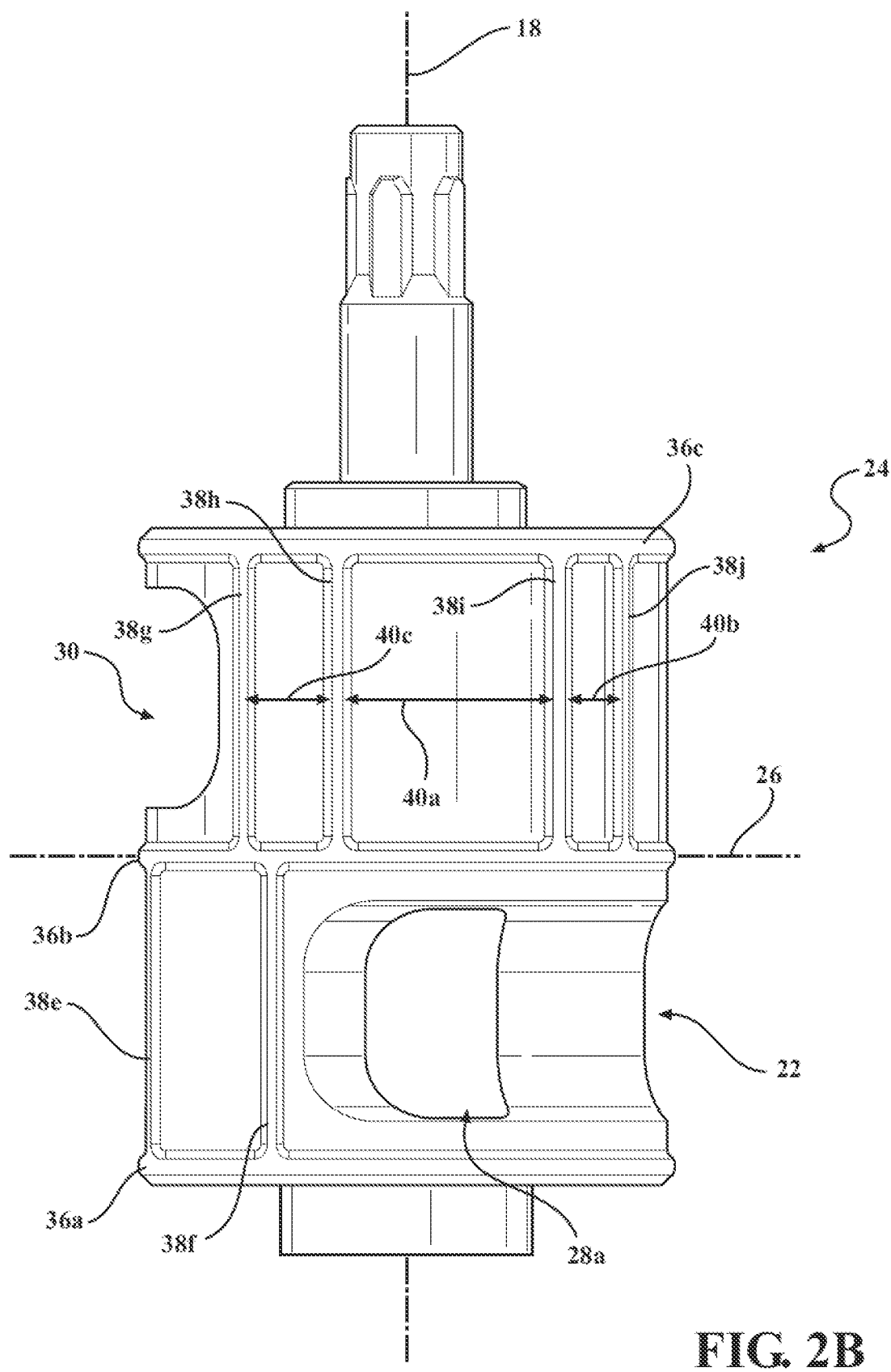
FIG. 2B a second perspective view of a rotor used as part of a coolant flow control valve having a seal assembly, according to embodiments of the present invention.
Figure 3B:
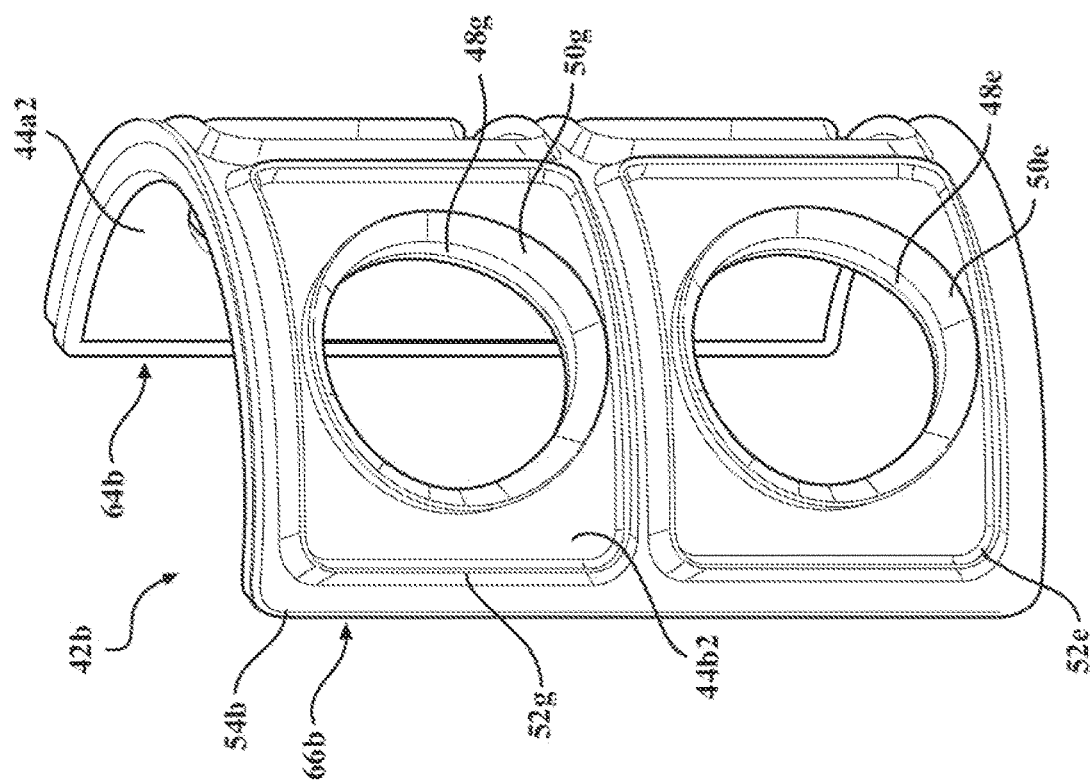
FIG. 3B a perspective view of a second sleeve used as part of a coolant flow control valve having a seal assembly, according to embodiments of the present invention.
Figure 3A:
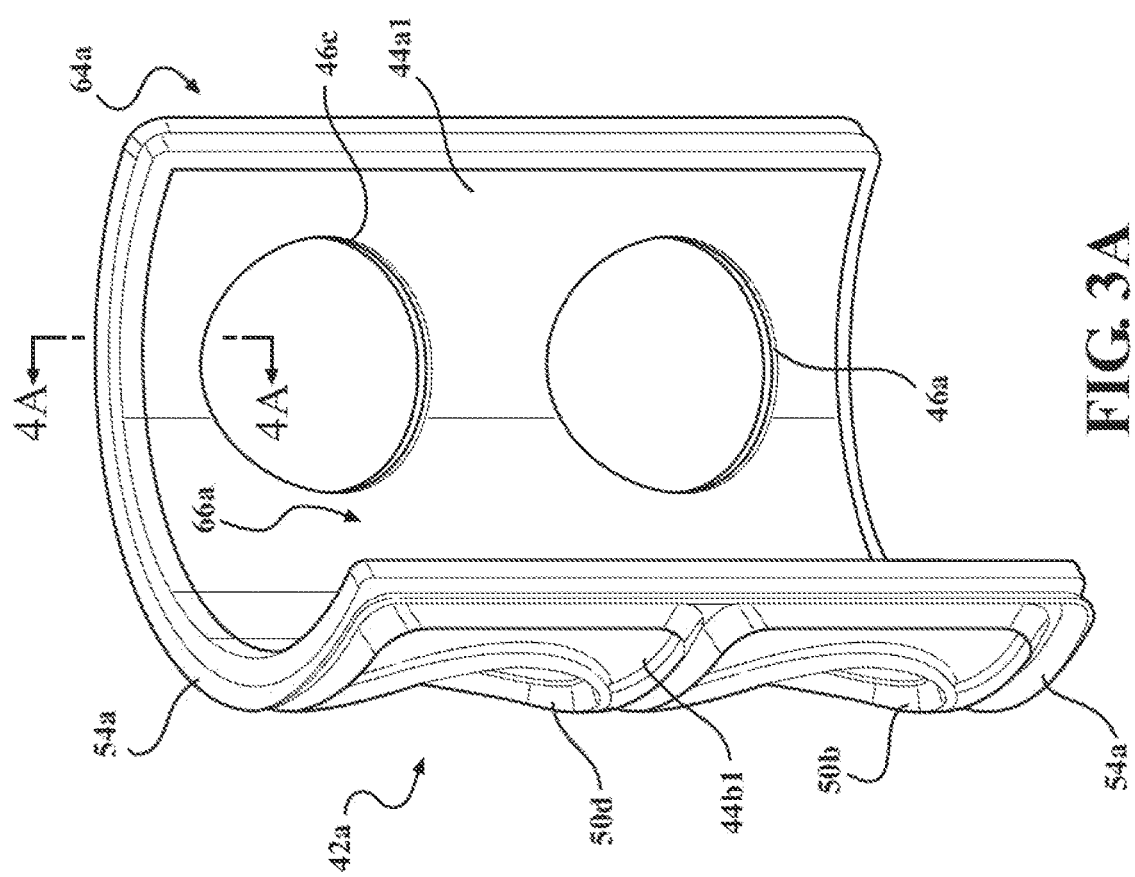
FIG. 3A a perspective view of a first sleeve used as part of a coolant flow control valve having a seal assembly, according to embodiments of the present invention.
Figure 4A:
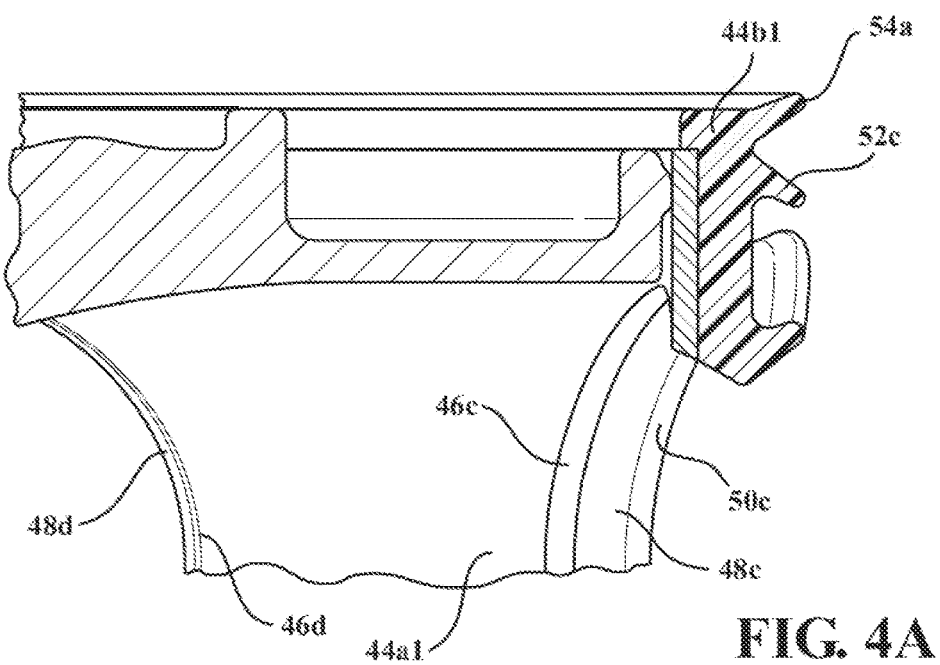
FIG. 4A a partial sectional view taken along lines 4A-4A of FIG. 3A.
Figure 4B:
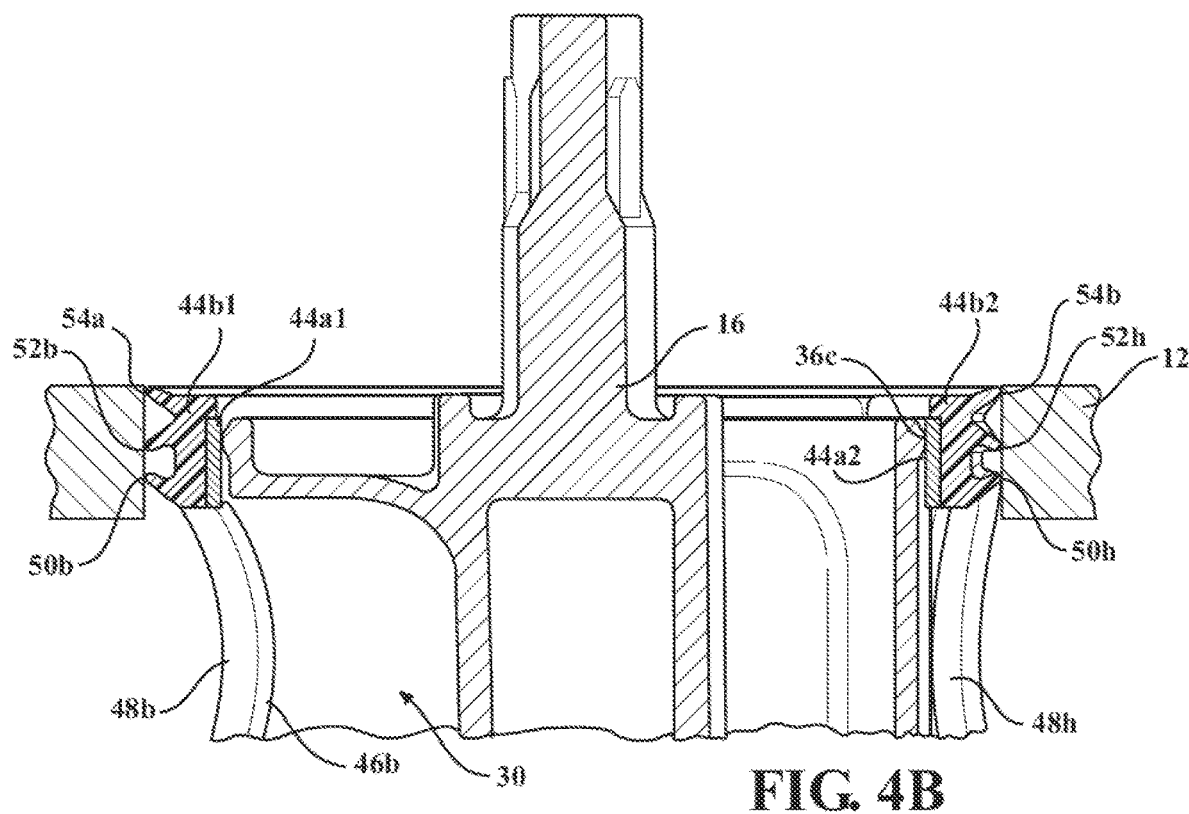
FIG. 4B a second partial sectional view of a coolant flow control valve having a seal assembly, according to embodiments of the present invention.

A first embodiment of a coolant flow control valve having a seal assembly according to the present invention in shown in FIGS. 1-6B generally at 10. Referring to FIGS. 1-2, the valve assembly 10 includes a housing 12, and inside the housing 12 is a cavity, shown generally at 14. Located in the cavity 14 is a valve member, which in this embodiment is a rotor, shown generally at 16. The rotor 16 is generally cylindrical in shape. The rotor 16 is able to rotate about an axis 18. In an embodiment, the rotor 16 is connected to a gear train, which is driven by an electric motor to rotate the rotor in the housing 12, but it is within the scope of the invention that the rotor 16 may be rotated using other devices.

Figure 5A:
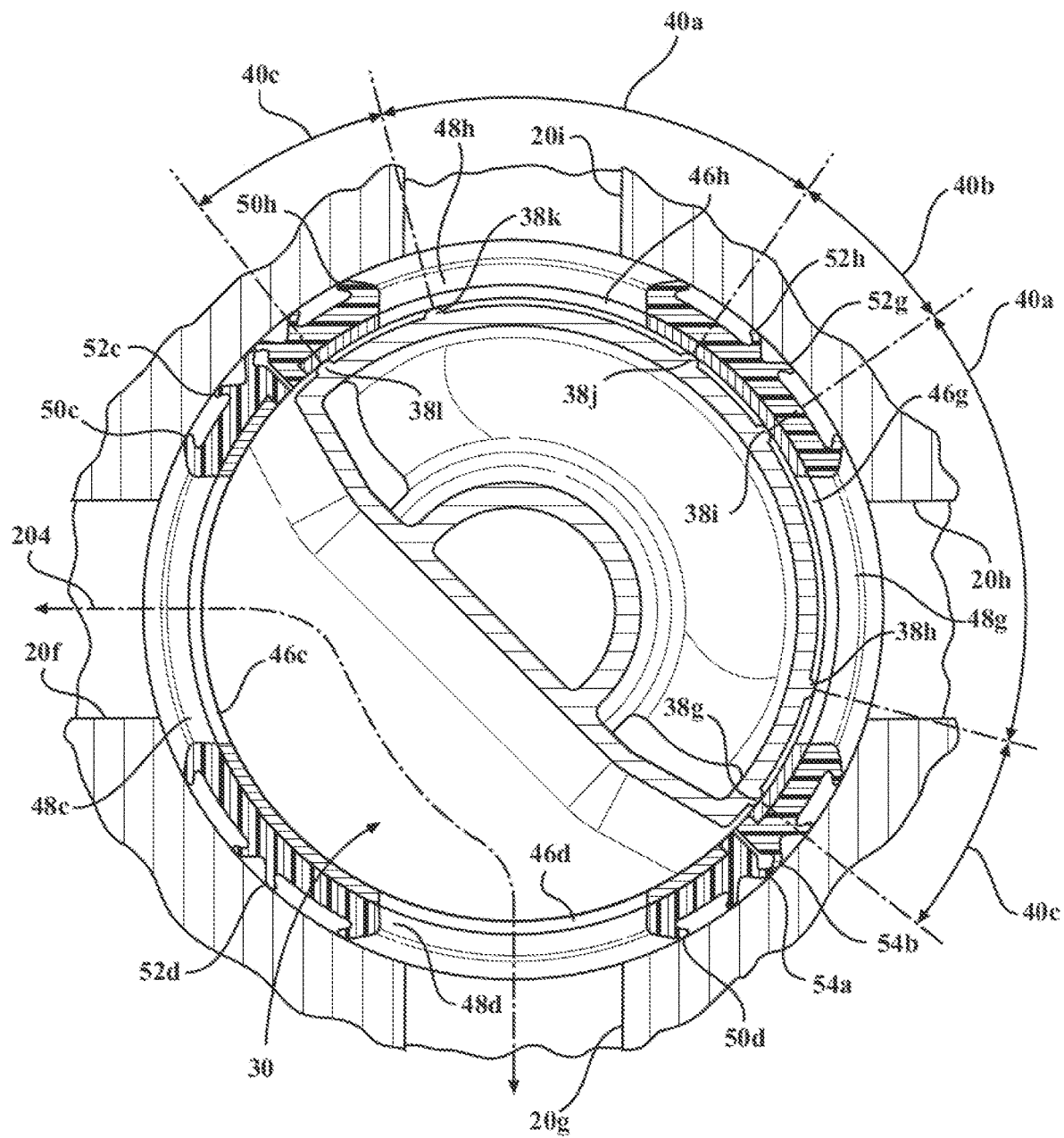
FIG. 5A is a sectional view of a coolant flow control valve having a seal assembly, with the rotor being in a first orientation, according to embodiments of the present invention.
Figure 5B:
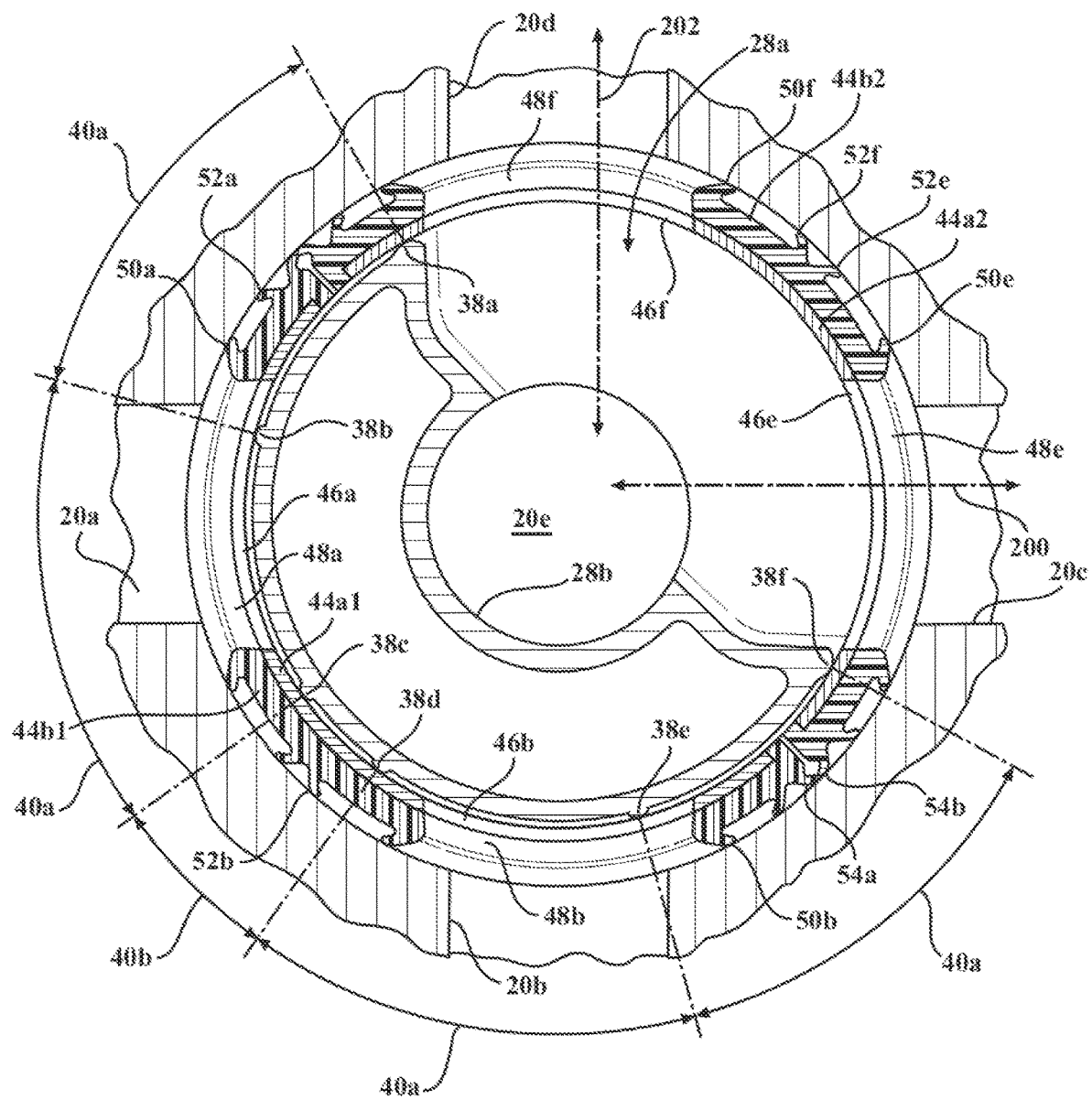
FIG. 5B is a second sectional view a coolant flow control valve having a seal assembly, with the rotor being in a first orientation, according to embodiments of the present invention.

Referring to FIGS. 1 and 5A-5B, the housing 12 includes several ports, in the embodiment shown, there are nine ports 20a,20b,20c,20d,20e,20f,20g,20h,20i, but it is within the scope of the invention that more or less ports may be included, and formed as part of the housing 12. The ports 20a-20i are in selective fluid communication with various channels integrally formed as part of the rotor 16. The rotor 16 has channels which distribute fluid between two levels, a first level, shown generally at 22, and a second level, shown generally at 24. The first level 22 and the second level 24 are separated by a plane 26, where the first level 22 is on one side of the plane 26, and the second level 24 is on the opposite side of the plane 26 as the first level 22.

Integrally formed as part of the rotor 16 is a first side channel, shown generally at 28a, and a second side channel, shown generally at 30, which are integrally formed as part of a body portion 32. The first side channel 28a is in fluid communication with a central channel 28b, and the first side channel 28a is perpendicular to the central channel 28b. The first side channel 28a and central channel 28b are located on the first level 22 and the second side channel 30 is located on the second level 24.

Figure 6A:
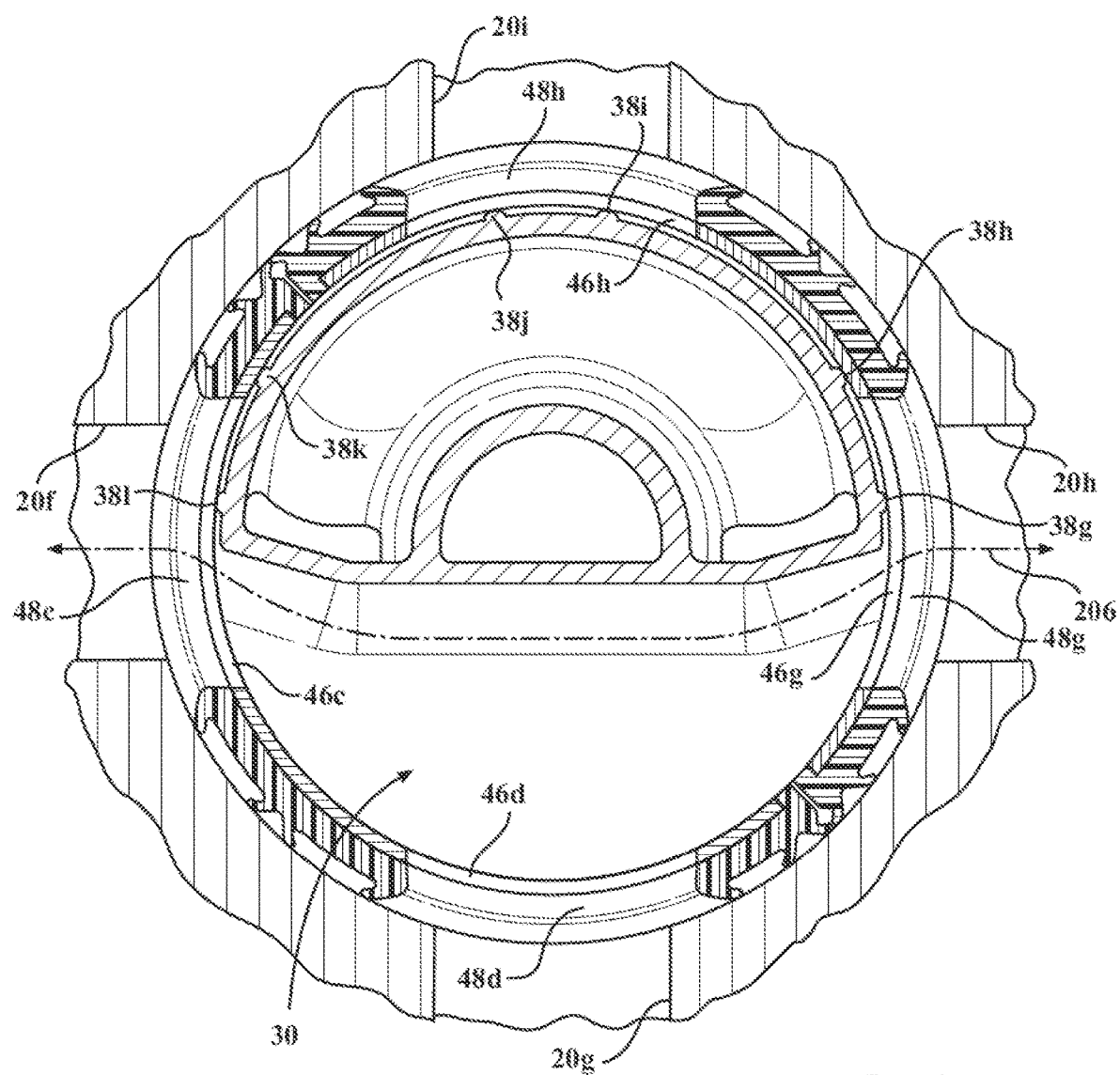
FIG. 6A is a sectional view a coolant flow control valve having a seal assembly, with the rotor being in a second orientation, according to embodiments of the present invention.
Figure 6B:
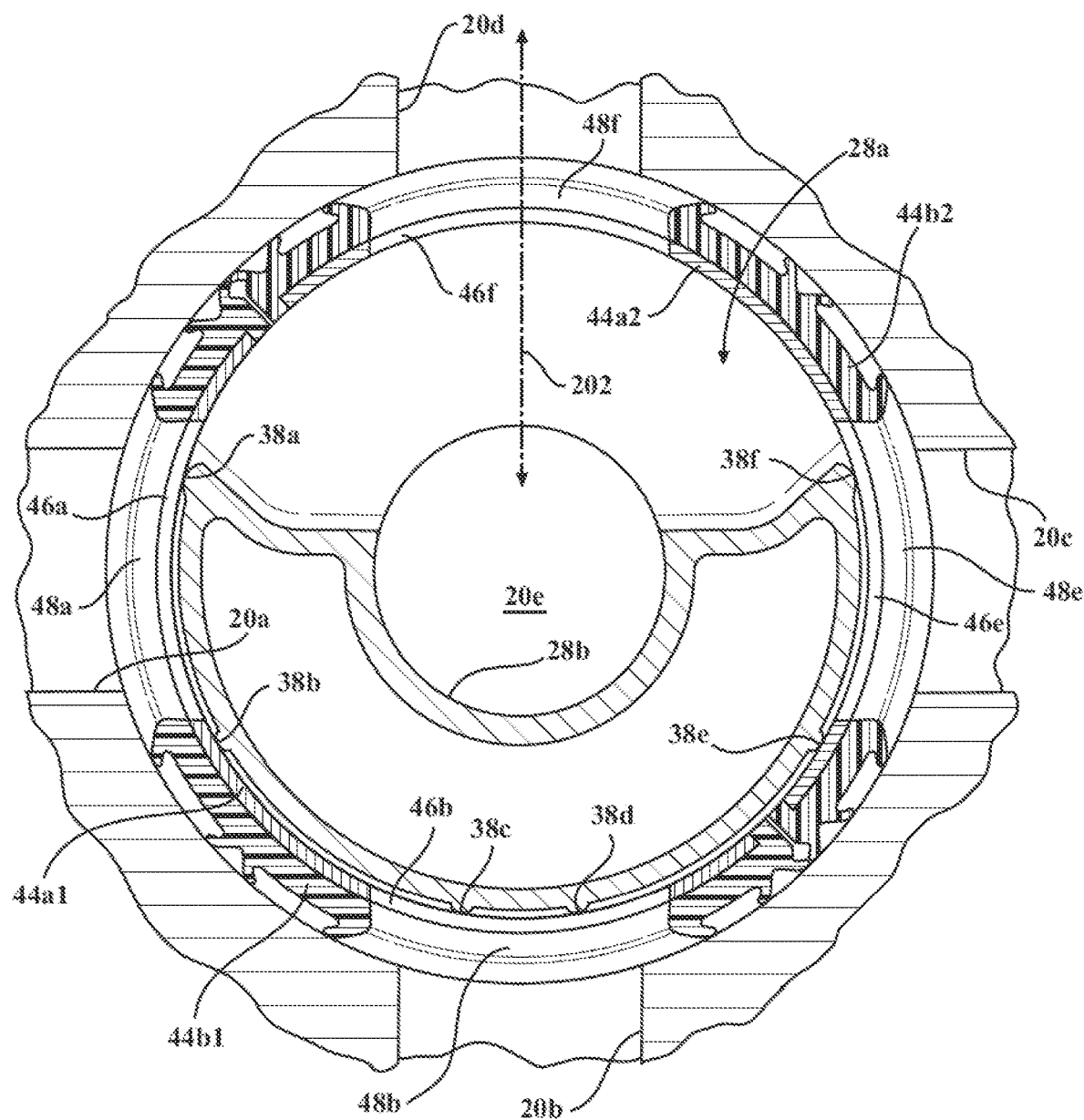
FIG. 6B is a second sectional view a coolant flow control valve having a seal assembly, with the rotor being in a second orientation, according to embodiments of the present invention.

In an embodiment, several of the ports 20a,20b,20c,20d, 20e shown in FIGS. 5B and 6B are one side of the plane 26 on the first level 22, and other ports 20f,20g,20h,20i are located on the opposite side of the plane 26 on the second level 24. However, it is within the scope of the invention that any combination of the ports 20a-20i may be on the first level 22 or the second level 24.

Integrally formed as part of the rotor 16 is a first circumferential bead 36a, a second circumferential bead 36b, and a third circumferential bead 36c. The first circumferential bead 36a is located in the first level 22, the second circumferential bead 36b is located in the plane 26, and the third circumferential bead 36c is in the second level 24. Each of the beads 36a,36b,36c circumscribe the body portion 32. Also formed as part of the rotor 16 is a plurality of tangential beads, where several of the tangential beads 38a,38b,38c, 38d,38e,38f are integrally formed as part of the rotor 16 located on the first level 22, and several of the tangential beads 38g,38h,38i,38j,38k,38l are integrally formed as part of the rotor 16 located on the second level 24, and have various circumferential spacing around the body portion 32. The tangential beads 38a,38b,38c,38d,38e,38f located in the first level 22 extend from the first circumferential bead 36a to the second circumferential bead 36b, and the tangential beads 38g,38h,38i,38j,38k,38l located in the second level 24 extend from the second circumferential bead 36b to the third circumferential bead 36c.

There are different types of circumferential spacing of the tangential beads 38a-38l. There is a first circumferential spacing 40a, a second circumferential spacing 40b, and a third circumferential spacing 40c, where the second circumferential spacing 40b is less than the first circumferential spacing 40a, and the third circumferential spacing 40c is larger than the second circumferential spacing 40b but smaller than the first circumferential spacing 40a. Although there are three different circumferential spacings 40a,40b, 40c shown, it is within the scope of the invention that any circumferential spacing may be used to accommodate different rotor and seal designs.

Referring to FIGS. 3A-4B, the valve assembly 10 also includes two seal elements, shown generally at 42a,42b, respectively, which along with the beads 36a,36b,36c,38a-38l and the housing 12 function as a seal assembly. Each seal element 42a,42b is of similar construction, so only one seal element is described. The seal element 42a includes a first inner sleeve 44a1 and a first outer sleeve 44b1. The first inner sleeve 44a1 circumscribes half of the rotor 16 and provides a surface which the beads 36a,36b,36c,38a-38l contact against to provide a sealing function. The inner sleeve 44a1 also includes four apertures 46a,46b,46c,46d, where two of the apertures 46a,46b are located in the first level 22, and two of the apertures 46c,46d are located in the second level 24.

The seal element 42b includes a second inner sleeve 44a2 and a second outer sleeve 44b2. The inner sleeve 44a2 circumscribes the other half of the rotor 16 and provides a surface which the beads 36a,36b,36c,38a-38l contact and seal against. The inner sleeve 44a2 also includes four apertures 46e,46f,46g,46h, where two of the apertures 46e, 46f are located in the first level 22, and two of the apertures 46g,46h are located in the second level 24.

The outer sleeve 44b1 also includes apertures 48a,48b, 48c,48d, where each aperture 48a,48b,48c,48d is in alignment with the corresponding aperture 46a,46b,46c,46d of the inner sleeve 44a1. Circumscribing each aperture 48a, 48b,48c,48d is a corresponding circular lip seal 50a,50c, 50c,50d. There are also four quadrant lip seals 52a,52b,52c, 52d, which are substantially rectangular-shaped, where two of the quadrant lip seals 52a,52b are located in the first level 22, and two of the quadrant lip seals 52c,52d are located in the second level 24. The outer sleeve 44b1 also includes a circumferential lip seal 54a, which circumscribes all of the quadrant lip seals 52a,52b,52c,52d, and is located along an outer periphery of the outer sleeve 44b1. The lip seals 50a,50c,50c,50d,52a,52b,52c,52d,54a are shaped to provide the desired compliance when the seal element 42a is compressed between the beads 36a,36b,36c,38a-38l and the housing 12, to achieve the desired sealing. It is within the scope of the invention that the lip seals 50a,50c,50c,50d, 52a,52b,52c,52d,54a may be pressure activated or stationary.

The outer sleeve 44b2 also includes apertures 48e,48f, 48g,48h, where each aperture 48e,48f,48g,48h is in alignment with a corresponding aperture 46e,46f,46g,46h of the inner sleeve 44a2. Circumscribing each aperture 48e,48f, 48g,48h is a corresponding circular lip seal 50e,50f,50g,50h. There are also four quadrant lip seals 52e,52f,52g,52h, which are substantially rectangular-shaped, where two of the quadrant lip seals 52e,52f are located in the first level 22, and two of the quadrant lip seals 52g,52h are located in the second level 24. The outer sleeve 44b2 also includes a circumferential lip seal 54b, which circumscribes all of the quadrant lip seals 52e,52f,52g,52h, and is located along an outer periphery of the outer sleeve 44b2. The lip seals 50e,50f,50g,50h,52e,52f,52g,52h,54b are shaped to provide the desired compliance when the seal element 42b is compressed between the beads 36a,36b,36c,38a-38l and the housing 12, to achieve the desired sealing. As with the other lip seals, it is within the scope of the invention that the lip seals 50e,50f,50g,50h, 52e,52f,52g,52h,54b may be pressure activated or stationary.

When assembled, each of the seal elements 42a,42b are positioned such that a first end 64a of the first outer sleeve 44b1 is adjacent a first end 64b of the second outer sleeve 44b2, and a second end 66a of the first outer sleeve 44b1 is adjacent a second end 66b of the second outer sleeve 44b2. Each seal element 42a,42b circumscribes half of the rotor 16. Furthermore, when assembled, the seal elements 42a, 42b fit in the cavity 14 between the rotor 16 and the housing 12 such that there is an interference fit, where a force is applied to the inner sleeves 44a1,44a2 by the various beads 36a,36b,36c,38a-38l of the rotor 16. The force applied to the inner sleeves 44a1,44a2 is therefore also applied to the outer sleeves 44b1,44b2 and the lip seals 50a-50h,52a-52h,54a, 54b.

The circumferential beads 36a,36b,36c and the tangential beads 38a-38l apply force to the inner surface of the inner sleeves 44a1,44a2, such that this force is applied to the outer sleeves 44b1,44b2, which results in the lip seals 50a,50b, 50c,50d,52a,52b,52c,52d,54a of the first outer sleeve 44b1 applying force to an inner surface 12a of the housing 12, and the lip seals 50e,50f,50g,50h,52e,52f,52g,52h,54b of the second outer sleeve 44b2 also applying force to the inner surface 12a of the housing 12. The inner surface 12a is part of the cavity 14 in which the rotor 16 and the seal elements 42a,42b are located. The circumferential beads 36a,36b,36c are in continuous contact with the inner sleeves 44a1,44a2 and therefore continuously apply force to the same location of the inner sleeves 44a1,44a2, which prevents fluid from flowing around the circumferential bead 36b, and being transferred between the two levels 22,24, and fluid is also prevented from flowing around the circumferential beads 36a,36c. The tangential beads 38a-38l are also in continuous contact with the inner sleeves 44a1,44a2, but apply force to different areas of the inner sleeves 44a1,44a2, which is dependent upon the orientation of the rotor 16.

Referring to FIGS. 5A-5B, the rotor 16 is placed in a first of a plurality of orientations, where there is flow between three of the ports and the first side channel 28a. More specifically, when the rotor 16 is in the first orientation, on the first level 22 fluid may flow from the fifth port 20e through the central channel 28b, through the first side channel 28a, and from the first side channel 28a through the apertures 46e,48e and the third port 20c, indicated by flow path 200, and also from the first side channel 28a through the apertures 46f,48f and the fourth port 20d, indicated by flow path 202. When the rotor 16 is in the first orientation, on the second level 24, fluid flows from the seventh port 20g, through the apertures 46d,48d, the second side channel 30, the apertures 46c,48c, and the sixth port 20f, indicated by flow path 204. The flow paths 200,202,204 have arrows to indicate that the flow may be in either direction.

When the rotor 16 is in the first orientation, the first tangential bead 38a is in contact with an area of the inner sleeve 44a2 which is adjacent the aperture 46f of the inner sleeve 44a2. The third tangential bead 38c is in contact with an area of the inner sleeve 44a1 which is adjacent aperture 46a, and the fourth tangential bead 38d is in contact with an area of the inner sleeve 44a1 which is adjacent the aperture 46b. The sixth tangential bead 38f is in contact with an area of the inner sleeve 44a2 which is adjacent the aperture 46e of the inner sleeve 44a2. The second tangential bead 38b is in contact with an area of the first inner sleeve 44a1 where the aperture 46a is located, such that only a portion of the second tangential bead 38b is in contact with the first inner sleeve 44a1, and the fifth tangential bead 38e is in contact with an area of the first inner sleeve 44a1 where the aperture 46b is located, such that only a portion of the fifth tangential bead 38e are in contact with the first inner sleeve 44a1.

The seventh bead 38g is in contact with the second inner sleeve 44a2 in an area of the second inner sleeve 44a2 which is adjacent to the second end 66b of the second outer sleeve 44b2. The ninth tangential bead 38i is in contact with an area of the inner sleeve 44a2 which is adjacent aperture 46g, and the tenth tangential bead 38j is in contact with an area of the second inner sleeve 44a2 which is adjacent the aperture 46h. The twelfth tangential bead 38l is in contact with the second inner sleeve 44a2 in an area of the second inner sleeve 44a2 which is adjacent the first end 64b of the second outer sleeve 44b2. The eighth tangential bead 38h is in contact with an area of the second inner sleeve 44a2 where the aperture 46g is located, such that only a portion of the eighth tangential bead 38h is in contact with second inner sleeve 44a2, and the eleventh tangential bead 38k is in contact with an area of the second inner sleeve 44a2 where the aperture 46h is located, such that only a portion of the eleventh tangential bead 38k is in contact with second inner sleeve 44a2.

Referring to FIGS. 6A-6B, the rotor 16 is placed in a second of the plurality of orientations. When the rotor 16 is in the second orientation, on the first level 22 fluid may flow from the fifth port 20e, through the central channel 28b, first side channel 28a, through two of the apertures 46f,48f, and the fourth port 20d, indicated by the flow path 202. When the rotor 16 is in the second orientation, on the second level 24, fluid flows from the sixth port 20f, through the apertures 46c,48c, through the second side channel 30, the apertures 46g,48g, and through the eighth port 20h, indicated by the flow path 206. The flow path 206 has arrows to indicate that the flow may be in either direction.

When the rotor 16 is in the second orientation, the second tangential bead 38b is in contact with an area of the inner sleeve 44a1 which is adjacent the first aperture 46a of the inner sleeve 44a1. The fifth tangential bead 38e is in contact with an area of the inner sleeve 44a2 which is adjacent the second end 66b of the second inner sleeve 44a2. The first tangential bead 38a is in contact with an area of the first inner sleeve 44a1 where the aperture 46a is located, such that only a portion of the first tangential bead 38a is in contact with the first inner sleeve 44a1. The third tangential bead 38c and the fourth tangential bead 38d are in contact with an area of the first inner sleeve 44a1 where the aperture 46b is located, such that only a portion of the third tangential bead 38c and the fourth tangential bead 38d are in contact with the first inner sleeve 44a1. The sixth tangential bead 38f in contact with an area of the second inner sleeve 44a2 where the aperture 46e is located such that only a portion of the sixth tangential bead 38f is in contact with second inner sleeve 44a2.

When the rotor 16 is in the second orientation, the eighth tangential bead 38h is in contact with an area of the inner sleeve 44a2 which is adjacent the seventh aperture 46g of the inner sleeve 44a2. The eleventh tangential bead 38k is in contact with an area of the first inner sleeve 44a1 in an area of the inner sleeve 44a1 which is adjacent the first end 64a of the first outer sleeve 44*b*1. The seventh tangential bead 38*g* is in contact with an area of the second inner sleeve 44*a*2 where the aperture 46*g* is located, such that only a portion of the seventh tangential bead 38*g* is in contact with the second inner sleeve 44*a*2. The ninth tangential bead 38*i* and the tenth tangential bead 38*j* are in contact with an area of the second inner sleeve 44*a*2 where the aperture 46*h* is located, such that only a portion of the ninth tangential bead 38*i* and the tenth tangential bead 38*j* are in contact with the second inner sleeve 44*a*2. The twelfth tangential bead 38*l* is in contact with an area of the first inner sleeve 44*a*1 where the aperture 46*e* is located such that only a portion of the twelfth tangential bead 38*l* is in contact with first inner sleeve 44*a*1.

In other examples, the rotor 16 may be oriented such that the ninth tangential bead 38*i* is in contact with an area of the inner sleeve 44*a*2 which is adjacent the first end 64*b* of the second inner sleeve 44*a*2, and the tenth tangential bead 38*j* is in contact with an area of the inner sleeve 44*a*1 which is adjacent the first end 64*a* of the first inner sleeve 44*a*1.

In an embodiment, the inner sleeves 44*a*1,44*a*2 of the seal elements 42*a*,42*b* are made of a Polytetrafluoroethylene (PTFE) material which is suitable for achieving the desired level of friction between the beads 36*a*,36*b*,36*c*,38*a*-38l and the inner surface of each of the inner sleeves 44*a*1,44*a*2, while still providing desired sealing, but it is within the scope of the invention that other materials may be used. Also, the outer sleeves 44*b*1,44*b*2 of each seal element 42*a*,42*b* is made of an ethylene propylene diene monomer rubber (EPDM) material, to provide the desired sealing, but it is within the scope of the invention that other materials may be used.

During operation, the rotor 16 is placed in various orientations such that the channels 28*a*,28*b*,30 direct fluid through the apertures 46*a*,46*b*,46*c*,46*d*,46*e*,46*f*,46*g*,46*h* of the inner sleeves 44*a*1,44*a*2 and the apertures 48*a*,48*b*,48*c*, 48*d*,48*e*,48*f*,48*g*,48*h* of the outer sleeves 44*b*1,44*b*2 such that the fluid has various flow paths 200,202,204,206, depending upon the orientation of the rotor 16. As the orientation of the rotor 16 is changed, so is the position of the tangential beads 38*a*-38*l*, which results in the tangential beads 38*a*-38*l* applying force to the inner sleeve 44*a*1,44*a*2 in the locations previously described, to achieve the desired sealing.

Figure 7A:
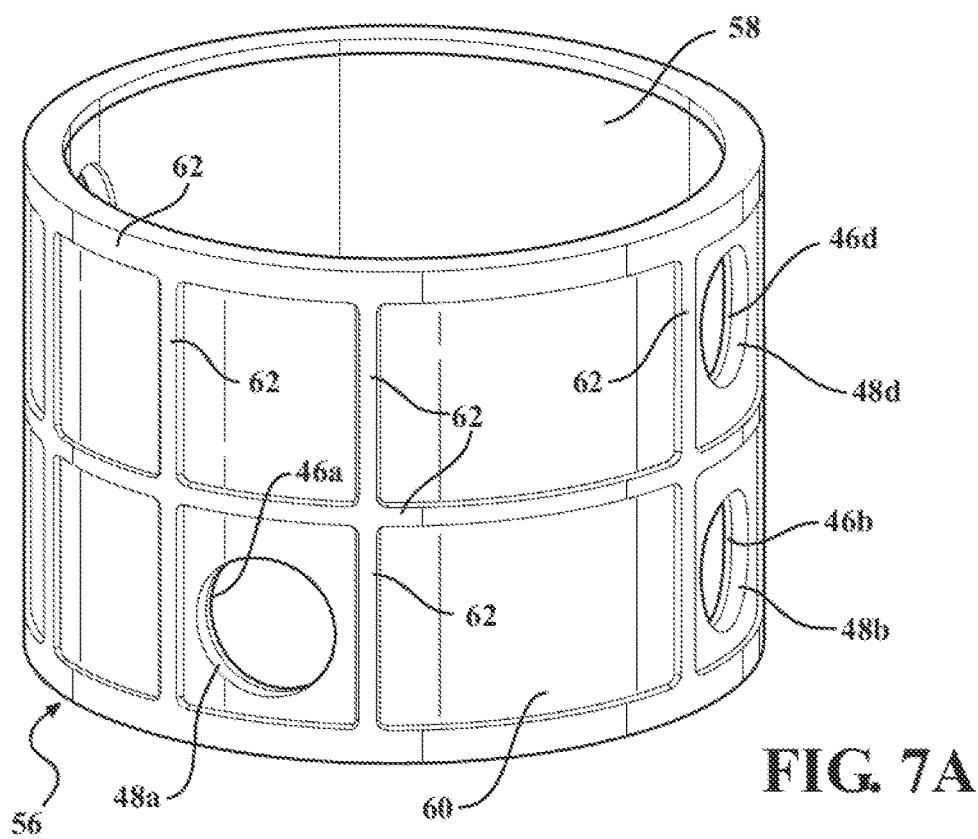
FIG. 7A is a perspective view of an alternate embodiment of a seal element used as part of a coolant flow control valve having a seal assembly, according to embodiments of the present invention.
Figure 7B:
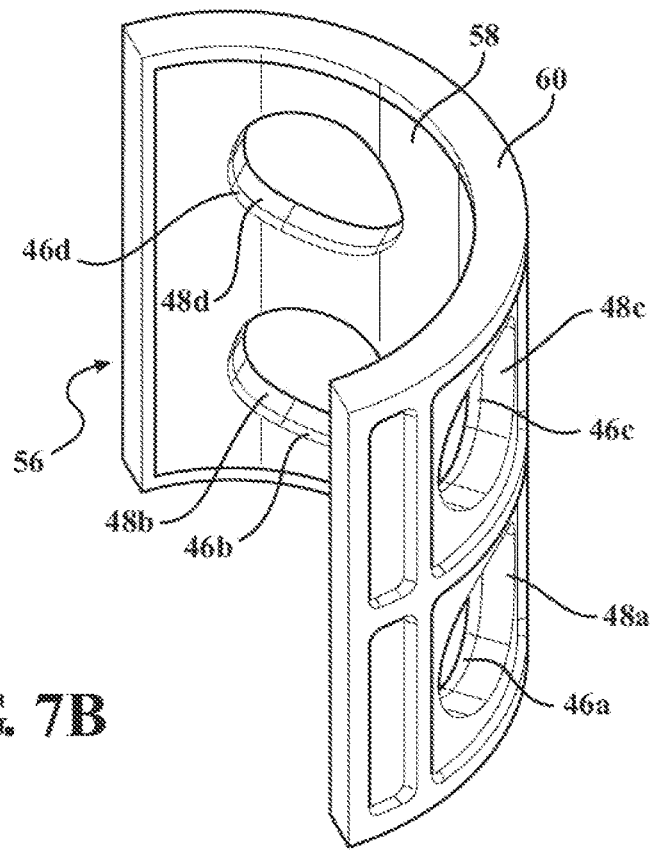
FIG. 7B is a perspective view of part of another alternate embodiment of a seal element used as part of a coolant flow control valve having a seal assembly, according to embodiments of the present invention.
Figure 8:
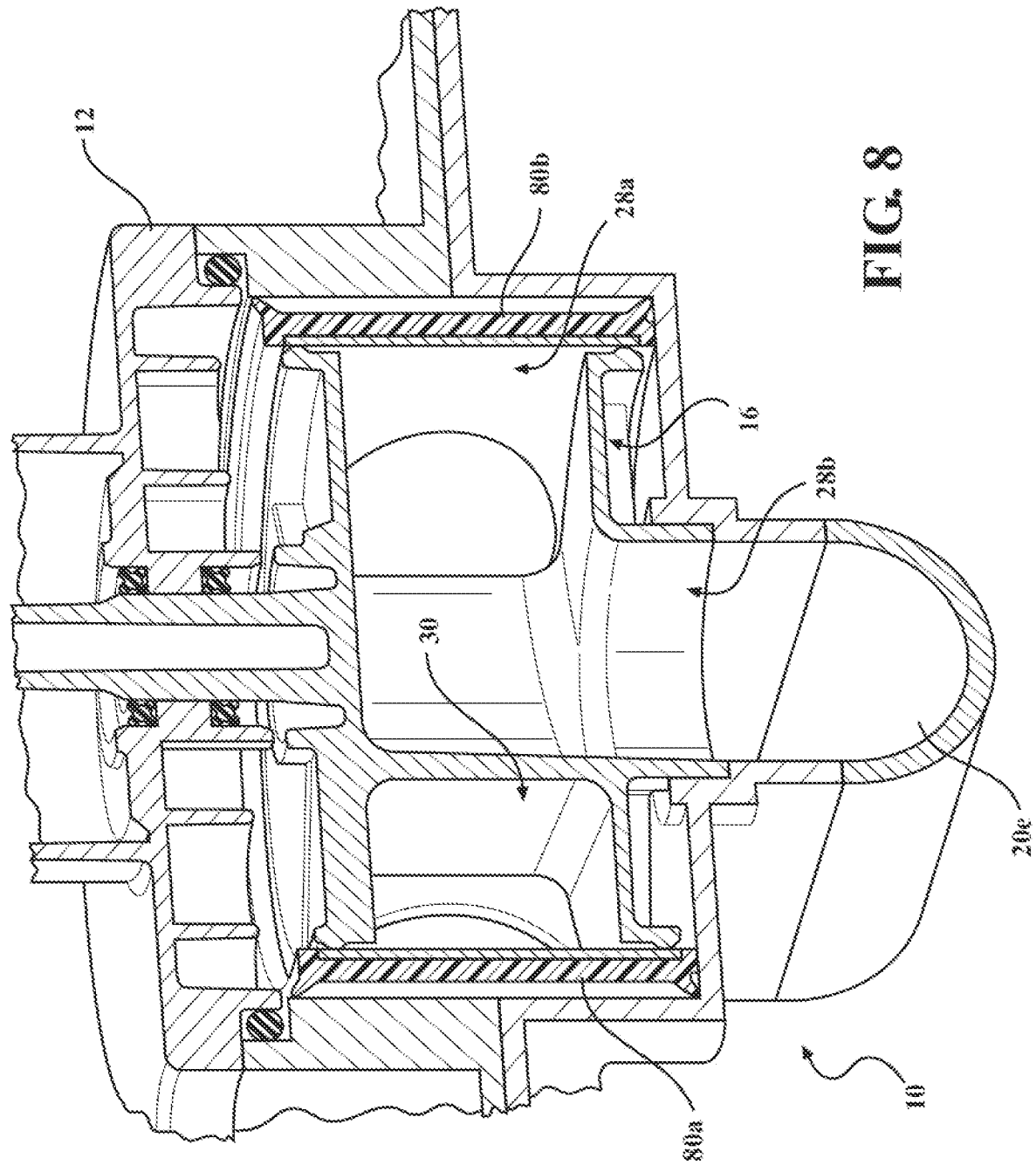
FIG. 8 is a sectional side view of a third alternate embodiment of a coolant flow control valve having a seal assembly, according to embodiments of the present invention.
Figure 9:
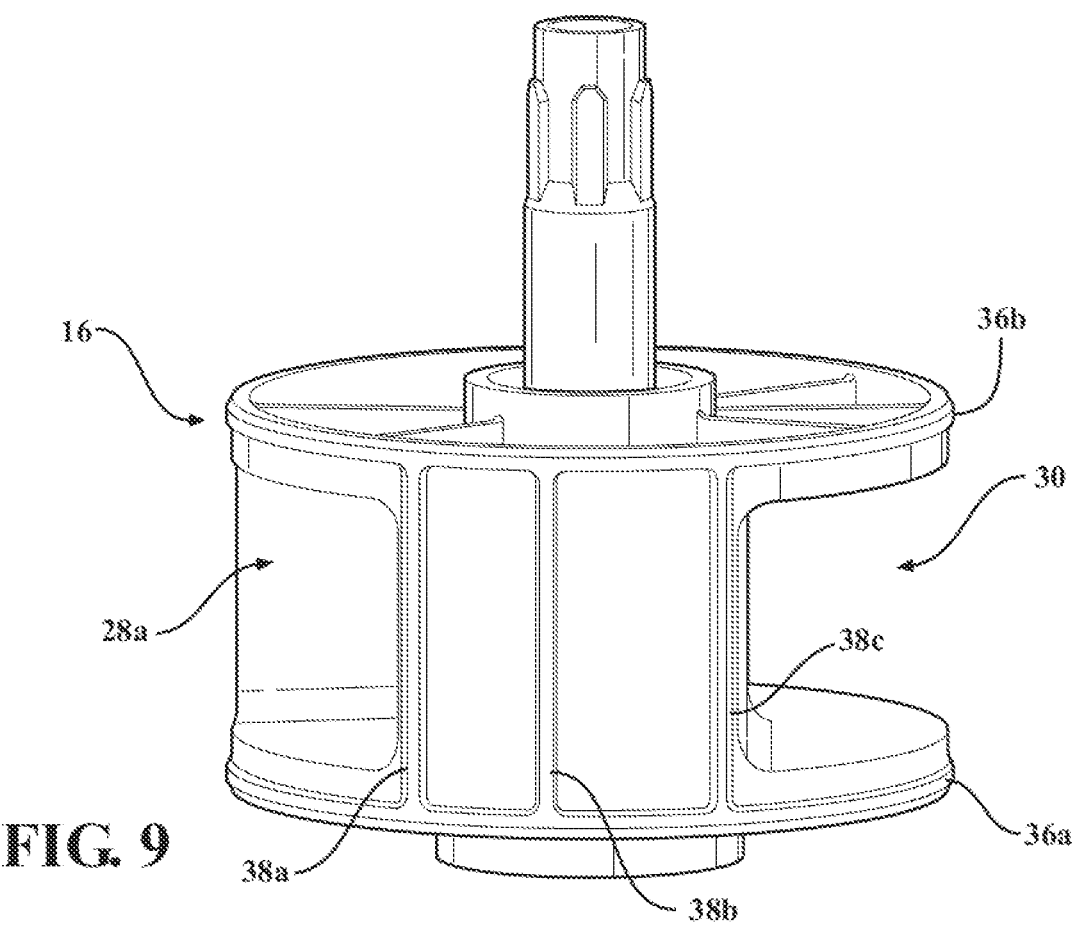
FIG. 9 is a perspective view of a rotor used as part of a third alternate embodiment of a coolant flow control valve having a seal assembly, according to embodiments of the present invention.
Figure 10:
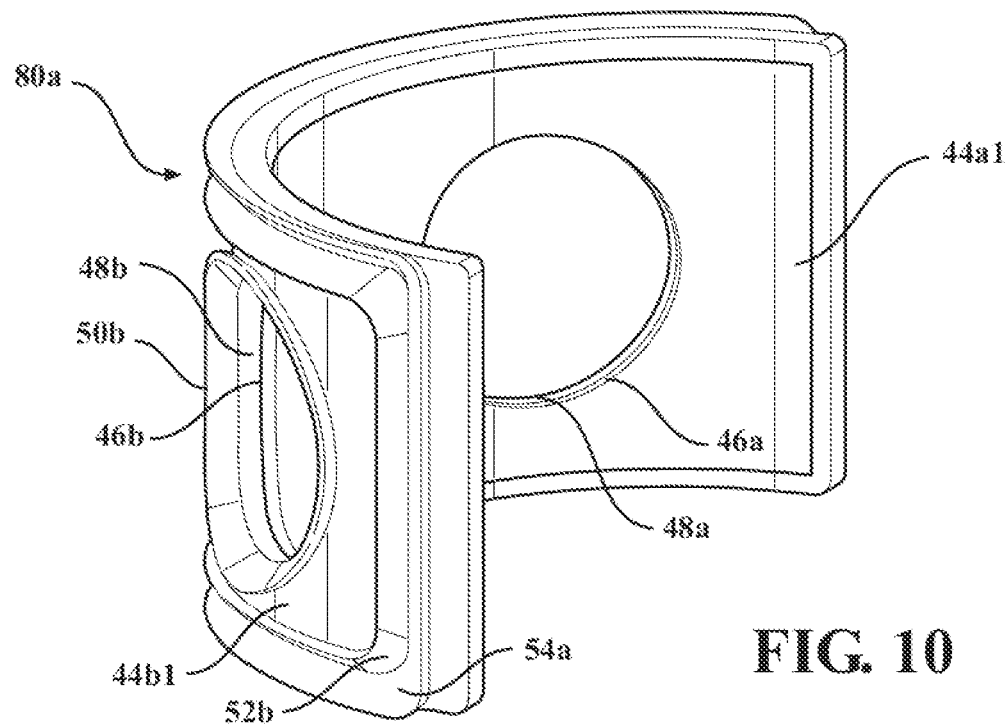
FIG. 10 is a perspective view of a seal element used as part of a third alternate embodiment of a coolant flow control valve having a seal assembly, according to embodiments of the present invention.
Figure 11A:
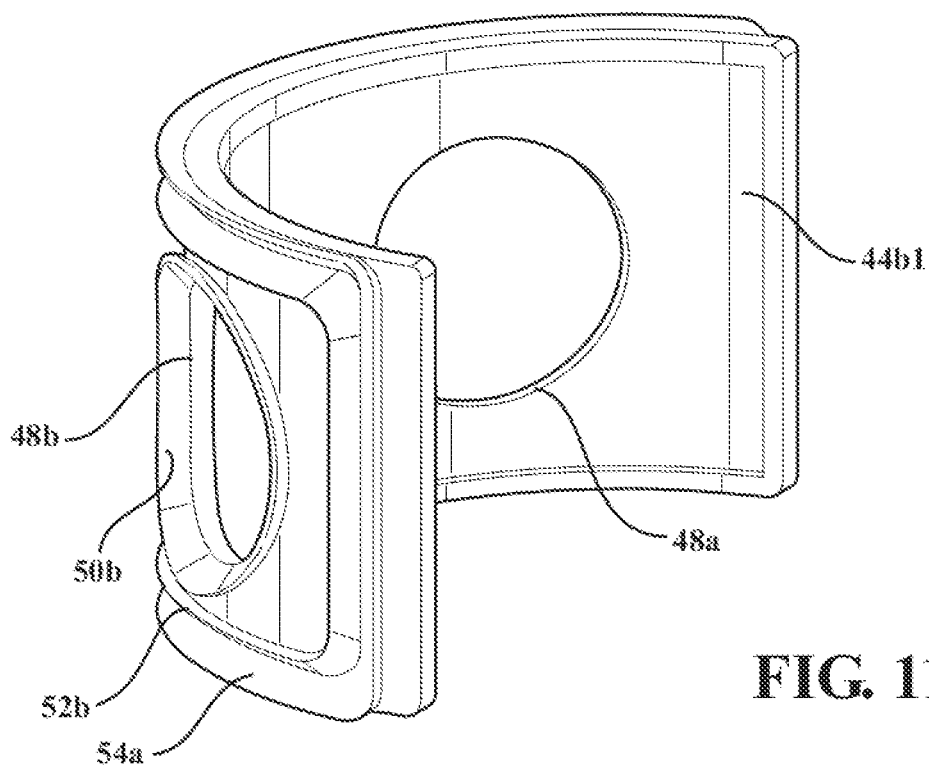
FIG. 11A is a perspective view of an outer sleeve used as part of a third alternate embodiment of a coolant flow control valve having a seal assembly, according to embodiments of the present invention.
Figure 11B:
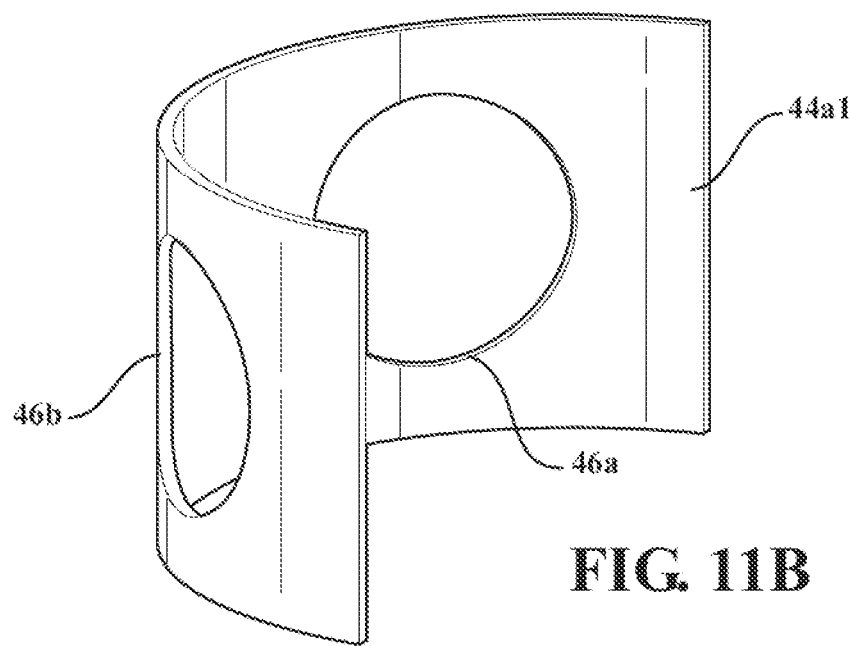
FIG. 11B is a perspective view of an inner sleeve used as part of a third alternate embodiment of a coolant flow control valve having a seal assembly, according to embodiments of the present invention.
Figure 12B:
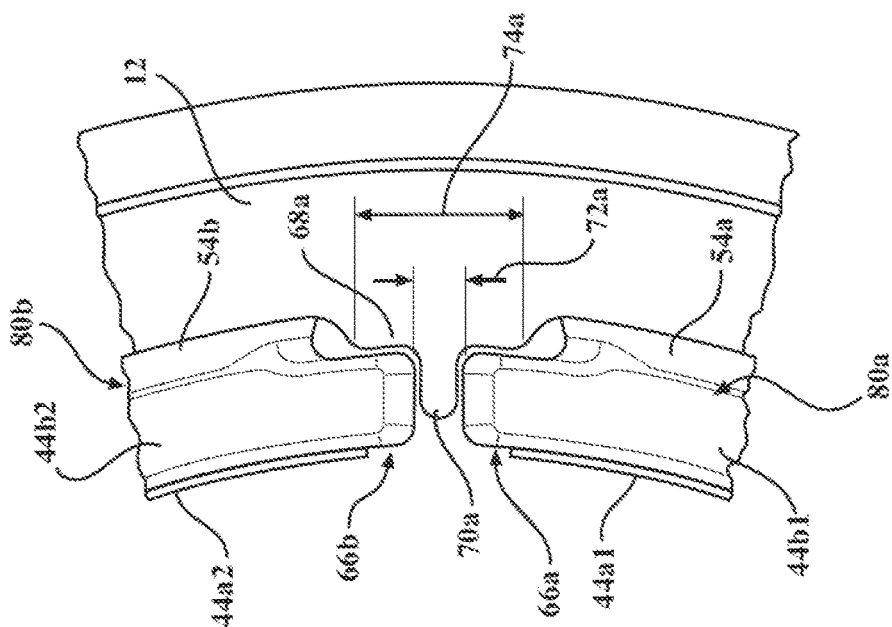
FIG. 12B is an enlarged view of the squared portion marked 12B in FIG. 12A.
Figure 12A:
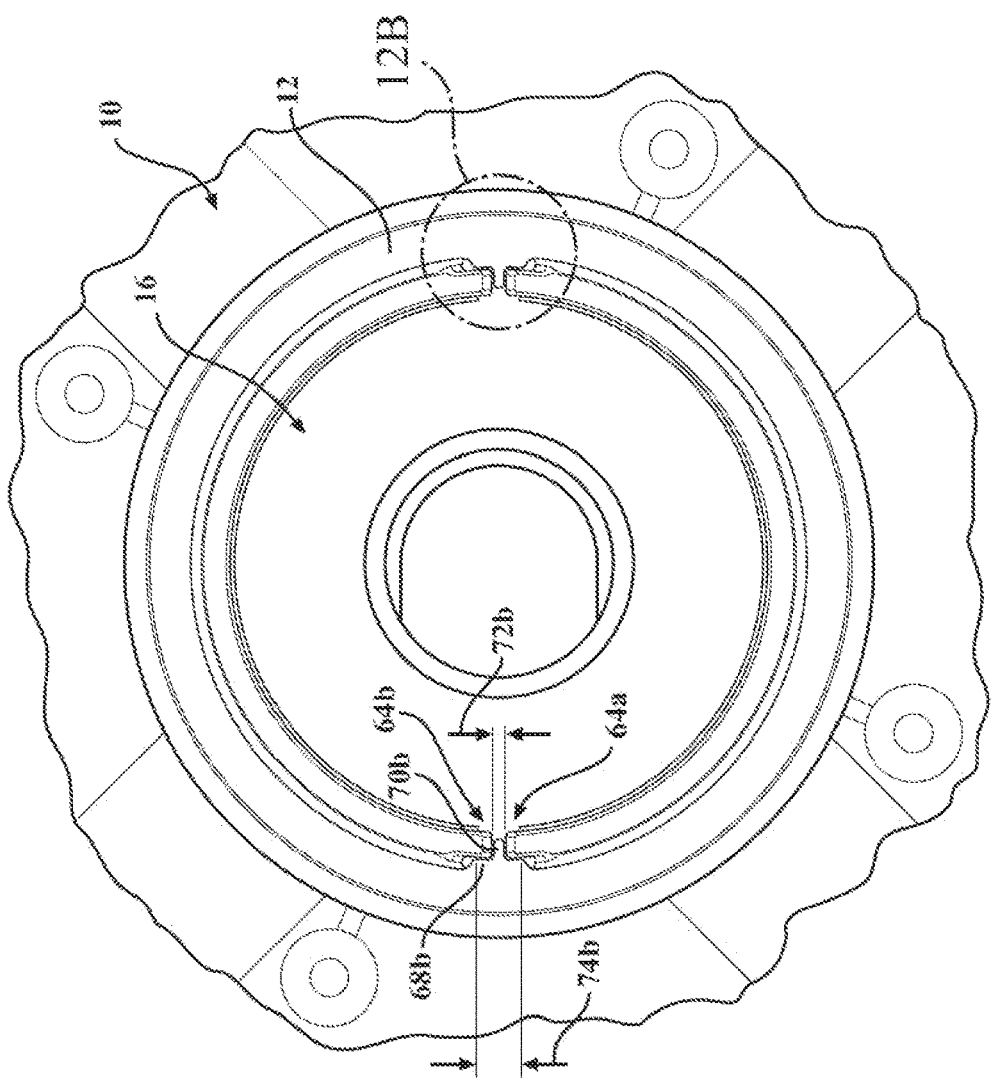
FIG. 12A is a first sectional view of a third alternate embodiment of a coolant flow control valve having a seal assembly, according to embodiments of the present invention.
Figure 13A:
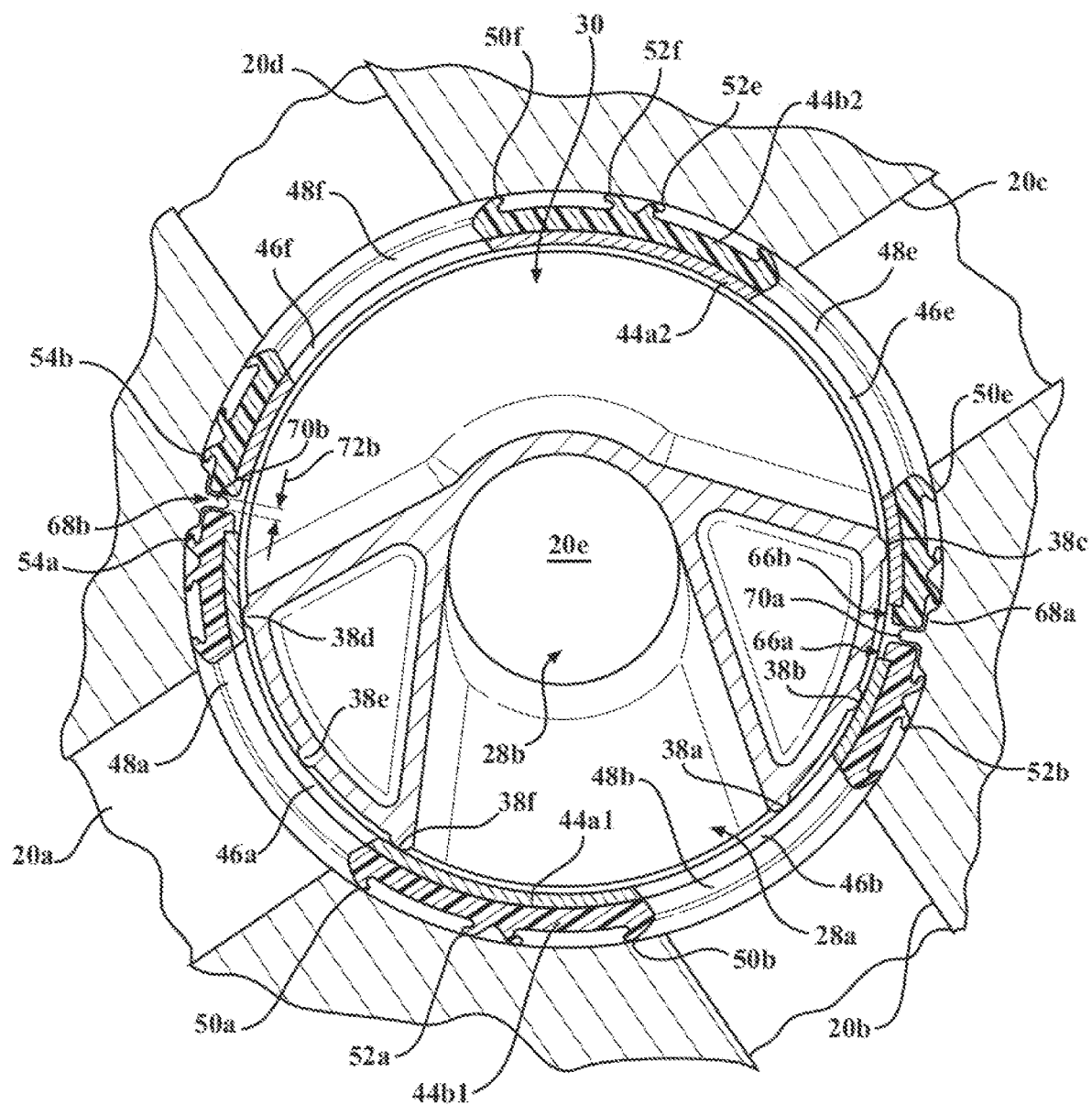
FIG. 13A is a second sectional view of a third alternate embodiment of a coolant flow control valve having a seal assembly, according to embodiments of the present invention.

A seal element according to an alternate embodiment is shown in FIG. 7A, generally at 56, with like numbers referring to like elements. In this embodiment, the seal element 56 has an inner sleeve 58 which is of unitary construction, and an outer sleeve 60 which is of unitary construction, such that the inner sleeve 58 and the outer sleeve 60 surround the rotor. The outer sleeve 60 does not have lip seals, as with the previous embodiment, but includes multiple rib portions 62, which apply force to the inner surface 12*a* of the housing 12 when the circumferential beads 36*a*,36*b*,36*c* and the tangential beads 38*a*-38*l* apply force to the inner surface of the inner sleeve 58. It is also within the scope of the invention that the seal element 56 shown in FIG. 7A may be constructed as two semi-circular shaped seal elements, an example of the seal element 56 as a semi-circular seal element is shown in FIG. 7B.

Another alternate embodiment of the present invention is shown in FIGS. 8-14A, where this embodiment includes a first seal element, shown generally at 80*a*, and a second seal element, shown generally at 80*b*, with like numbers referring to like elements shown in the previously described embodiment. Referring to FIGS. 12A-13B, in this embodiment, the rotor 16 and the seal elements 80*a*,80*b* only have one level, and are comparable to the portion of the rotor 16 and the portion of the seal elements 42*a*,42*b* as described in the first embodiment which are on the first level 22. The rotor 16 in this embodiment also has both channels 28*a*,30 on the same level. However, referring to FIGS. 10A-10B, in this embodiment, there are two support members 68*a*,68*b* integrally formed as part of the inner surface 12*a* of the housing 12, and there are two support protrusions 70*a*,70*b*, where each support protrusion 70*a*,70*b* is integrally formed as part of one of the corresponding support members 68*a*, 68*b*. In the embodiment shown, there is a gap 72*a* between the second end 66*a* of the first outer sleeve 44*b*1 and the second end 66*b* of the second outer sleeve 44*b*2. The width 74*a* of the support member 68*a* is wider than the gap 72*a*, and the support member 68*a* is adjacent the second end 66*a* of the first outer sleeve 44*b*1 and the second end 66*b* of the second outer sleeve 44*b*2. There is also a gap 72*b* between the first end 64*a* of the first outer sleeve 44*b*1 and the first end 64*b* of the second outer sleeve 44*b*2. The width 74*b* of the support member 68*b* is wider than the gap 72*b*, and the support member 68*b* is adjacent the first end 64*a* of the first outer sleeve 44*b*1 and the first end 64*b* of the second outer sleeve 44*b*2.

The support protrusion 70*a* extends into the gap 72*a*, and the support protrusion 70*b* extends into the gap 72*b*, and the support protrusions 70*a*,70*b* prevent rotation of the seal elements 80*a*,80*b* relative to the housing 12 as the rotor 16 is rotated.

Additionally, the embodiment shown in FIGS. 8-14A may also incorporate more than one of the first seal element 80*a* and more than one of the second seal element 80*b* such that seal elements 80*a*,80*b* of this embodiment may be used with a housing and a rotor having more than one level, such as the rotor 16 and housing 12 shown in the first embodiment.

Additional alternate embodiments of a seal element is shown in FIGS. 14B and 14C. In FIG. 14B, the seal element 82 is shown and is similar to the seal element 80*a*, with like numbers referring to like elements, and includes an inner sleeve 82*a* having a reduced thickness compared to the inner sleeve 44*a*2 shown in FIG. 14A, and a portion 86 of the outer sleeve 82*b* is also of a reduced thickness compared to the outer sleeve 44*b*2 shown in FIG. 14A. In FIG. 14C, another embodiment of a seal element 84 is shown, having an inner sleeve 84*a* and an outer sleeve 84*b*, where the inner sleeve 84*a* is of a reduced thickness compared to the inner sleeve 44*a*2 shown in FIG. 14A, and the main portion 88 of the outer sleeve 84*b* is of a reduced thickness compared to the outer sleeve 44*b*2 shown in FIG. 14A.

Another embodiment of the seal assembly of the present invention is shown in FIGS. 15A-15E, where this embodiment includes a first seal element, shown generally at 90*a*, and a second seal element, shown generally at 90*b*, with like numbers referring to like elements shown in the previously described embodiments. The seal elements 90*a*,90*b* are of similar design and construction.

Figure 15A:
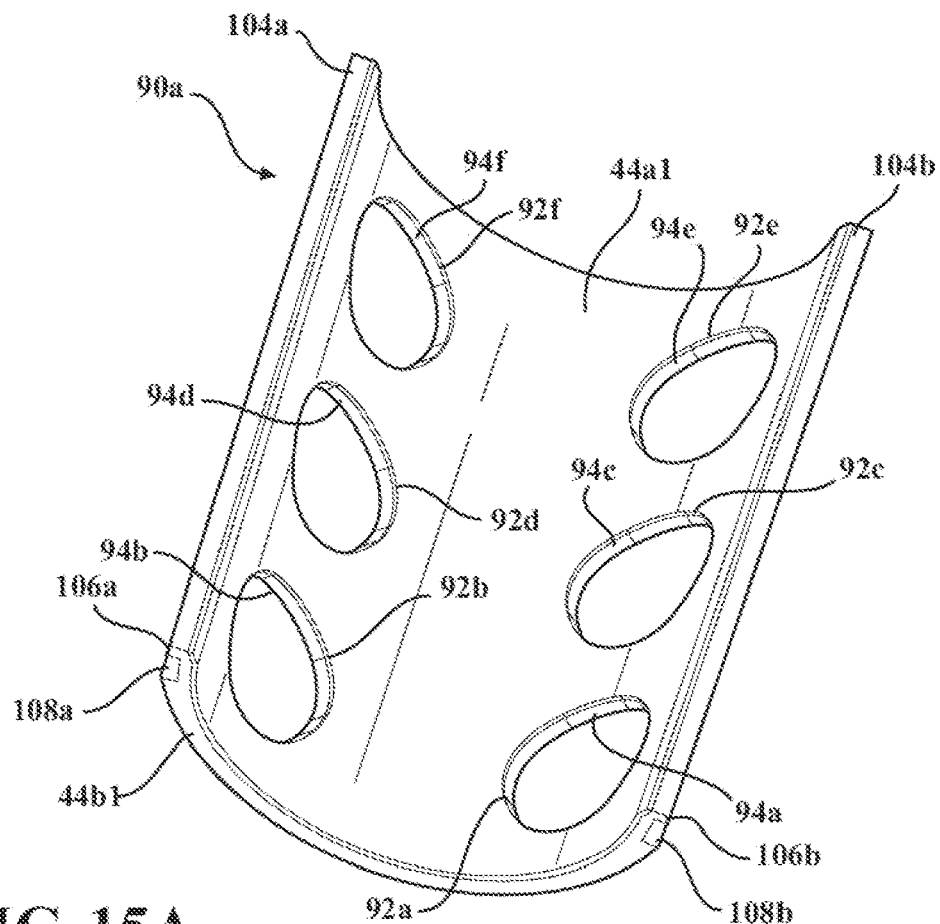
FIG. 15A is a perspective view of a first seal element which is part of a sixth alternate embodiment of a coolant flow control valve having a seal assembly, according to embodiments of the present invention.
Figure 15B:
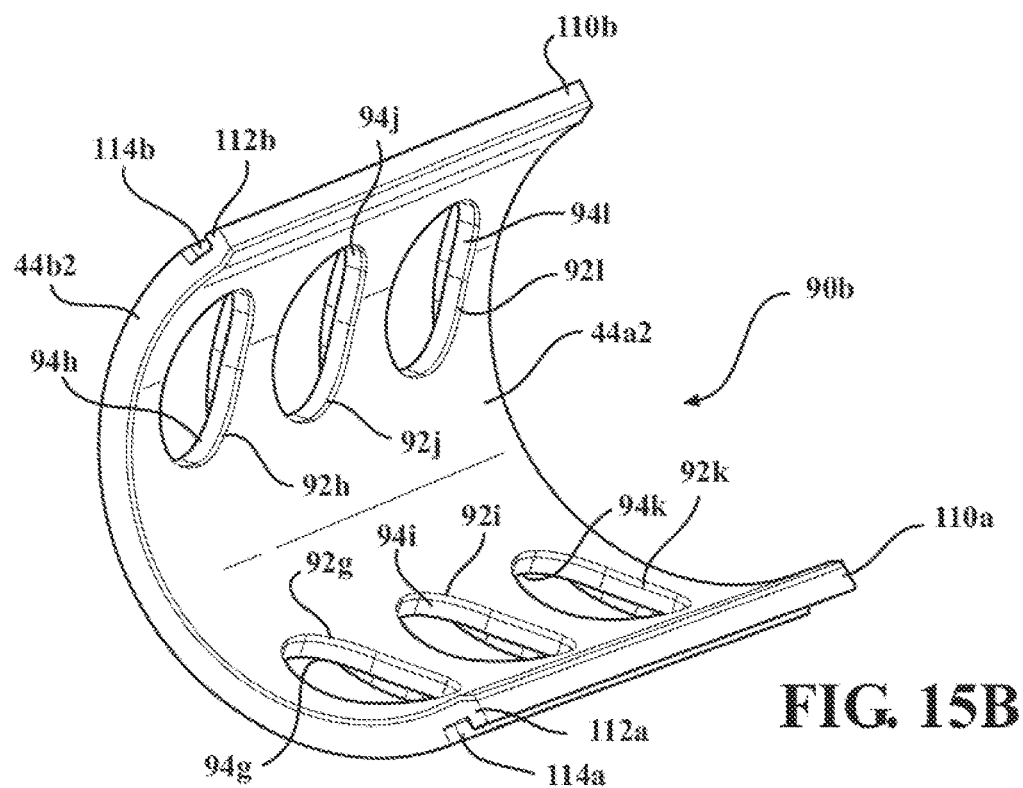
FIG. 15B is a perspective view of a second seal element which is part of a sixth alternate embodiment of a coolant flow control valve having a seal assembly, according to embodiments of the present invention.
Figure 15F:
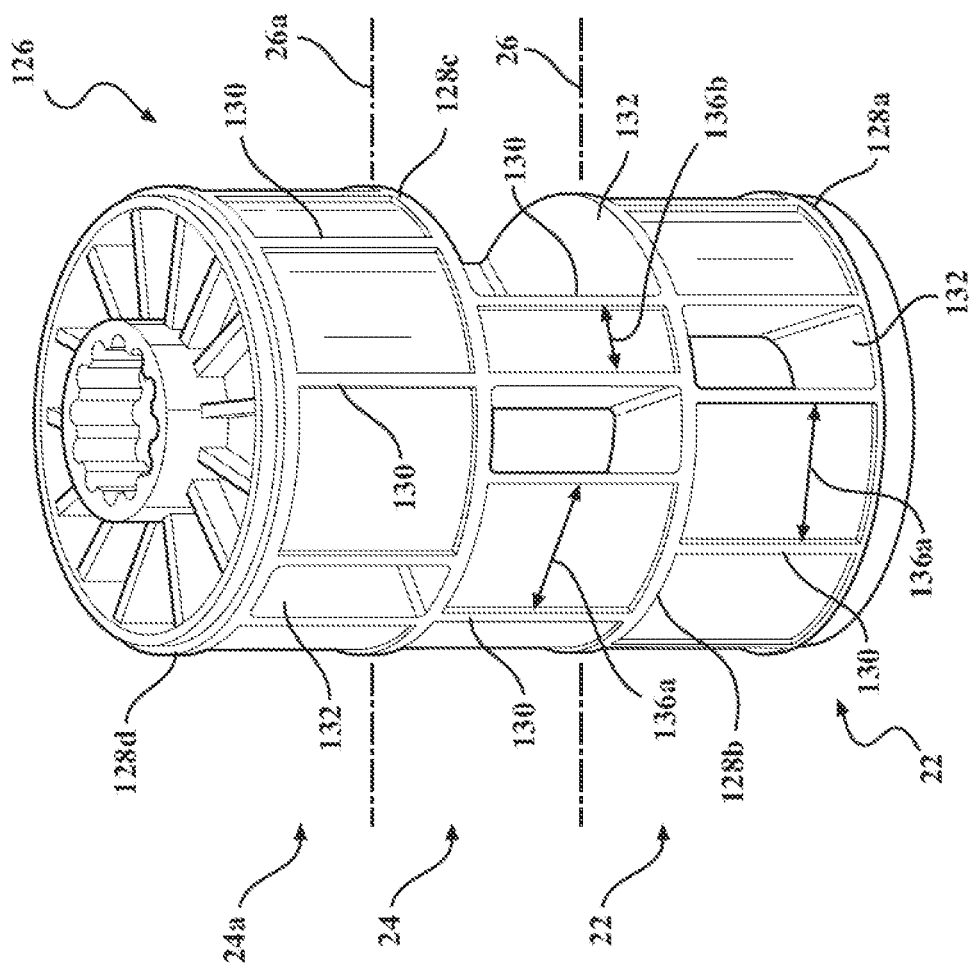
FIG. 15F is a perspective view of a rotor which is part of a sixth alternate embodiment of a coolant flow control valve having a seal assembly, according to embodiments of the present invention.
Figure 15E:
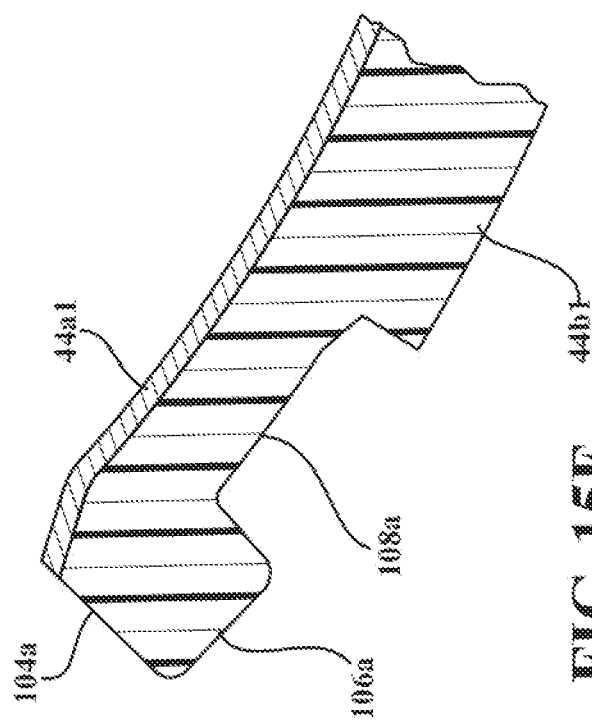
FIG. 15E is an enlarged view of a portion of a first seal element which is part of a sixth alternate embodiment of a coolant flow control valve having a seal assembly, according to embodiments of the present invention.

In the embodiment shown, the seal assembly is used with a rotor, shown generally at 126 in FIG. 15F, which is able to distribute fluid between three levels, instead of two. However, the rotor 126 may still be suitable for use with the housing 12 shown in FIG. 1, with the housing 12 having thirteen ports, instead of nine. More specifically, there is the first level 22, the second level 24, and a third level, shown generally at 24*a* in FIGS. 15C,15E. As with the previous embodiment, the first level 22 and the second level 24 are separated by the plane 26, and the second level 24 and the third level 24*a* are separate by a second plane 26*a*, where the second level 24 is on one side of the plane 26a, and the third level 24a is on the opposite side of the plane 26a as the second level 24.

As shown in FIG. 15F, the rotor 126 includes circumferential beads 128a,128b,128c,128d, and tangential beads, several of which are referenced at 130, and also several channels 132 which are used to distribute fluid between the various levels 22,24,24a. As with the previous embodiments, there is also different circumferential spacing 136a, 136b between the tangential beads 130.

As with the previous embodiments, the first inner sleeve 44a1 circumscribes half of the rotor 126 and provides a surface which the beads 128a,128b,128c,128d,130 contact against to provide a sealing function in a similar manner to the previous embodiments. In this embodiment, the inner sleeve 44a1 also includes six apertures 92a,92b,92c,92d, 92e,92f where two of the apertures 92a,92b are located in the first level 22, and two of the apertures 92c,92d are located in the second level 24, and two of the apertures 92e,92f are located in the third level 24a.

The seal element 42b includes a second inner sleeve 44a2 and a second outer sleeve 44b2. The inner sleeve 44a2 circumscribes the other half of the rotor and also provides a surface which the beads 128a,128b,128c,128d,130 contact and seal against to provide a sealing function in a similar manner to the previous embodiments. In this embodiment, the inner sleeve 44a2 also includes six apertures 92g,92h, 92i,92j,92k,92l, where two of the apertures 92g,92h are located in the first level 22, and two of the apertures 92i,92j are located in the second level 24, and two of the apertures 92k,92l are located in the third level 24a.

The outer sleeve 44b1 also includes apertures 94a,94b, 94c,94d,94e,94f where each aperture 94a,94b,94c,94d,94e, 94f is in alignment with the corresponding aperture 92a, 92b,92c,92d,92e,92f of the inner sleeve 44a1. The outer sleeve 44b2 also includes apertures 94g,94h,94i,94j,94k,94l, where each aperture 94g,94h,94i,94j,94k,94l is in alignment with a corresponding aperture 92g,92h,92i,92j,92k,92l of the inner sleeve 44a2.

The fluid which flows through the channels 132 also flows through one or more of the apertures 92a-92f,94a-94f of the seal element 42a and the apertures 92g-92l,94g-94l of the seal element 42b, in a similar manner described in the previous embodiments.

Referring now to FIGS. 15C-15D, integrally formed with the seal element 90a is several longitudinal ribs 96a-96d, each of which extends the entire height of the seal element 90a,90b. The longitudinal ribs 96a,96b are adjacent the apertures 94a,94c,94e, and the longitudinal ribs 96c,96d are adjacent the apertures 94b,94d,94f. Also integrally formed with the seal element 90a is several transverse ribs 98, which are generally perpendicular to the longitudinal ribs 96a-96d. The transverse ribs 98 are also adjacent the apertures 94a, 94b,94c,94d,94e,94f as shown in FIGS. 15C-15D. Also formed as part of the seal element 90a is a plurality of secondary transverse ribs 100 and secondary longitudinal ribs 102.

The seal elements 90a,90b fit in the cavity 14 between the rotor 126 and the housing 12 such that there is an interference fit, where a force is applied to the inner sleeves 44a1,44a2 by the various beads 128a,128b,128c,128d,130 of the rotor 126, in a similar manner to the previous embodiments. The force applied to the inner sleeves 44a1, 44a2 is therefore also applied to the outer sleeves 44b1,44b2 and the longitudinal ribs 96a-96d,102 and the transverse ribs 98,100.

The longitudinal ribs 96a-96d,102 and transverse ribs 98,100 may be pressure activated or stationary. The longitudinal ribs 96a-96d,102 and transverse ribs 98,100 are shaped to provide the desired compliance when the seal element 90a is compressed between the beads 128a,128b, 128c,128d,130 and the housing 12, to achieve the desired sealing.

Integrally formed as part of a first end 104a of the seal element 90a is a first outer rib 106a, and integrally formed as part of a second end 104b of the seal element 90a is a second outer rib 106b. Adjacent the first outer rib 106a is a first outer groove 108a, and adjacent the second outer rib 106b is a second outer groove 108b. Similarly, integrally formed with a first end 110a of the seal element 90b is a third outer rib 112a, and integrally formed as part of a second end 110b of the seal element 90b is a fourth outer rib 112b. Adjacent the third outer rib 112a is a third outer groove 114a, and adjacent the fourth outer rib 112b is a fourth outer groove 114b. The outer ribs 106a,106b,112a,112b and outer grooves 108a,108b,114a,114b extend the entire height of the seal elements 90a,90b, respectively.

When assembled, each of the seal elements 90a,90b are positioned such that the first end 104a of the first seal element 90a is adjacent the first end 110a of the second seal element 90b, and a second end 104b of the first seal element 90a is adjacent a second end 110b of the second seal element 90b. Each seal element 90a,90b circumscribes half of the rotor 126. Furthermore, when assembled, the seal elements 90a,90b fit in the cavity between the rotor 126 and the housing 12 such that there is an interference fit, where a force is applied to the inner sleeves 44a1,44a2 by the various beads 128a,128b,128c,128d,130 of the rotor 126. The force applied to the inner sleeves 44a1,44a2 is therefore also applied to the outer sleeves 44b1,44b2 and the longitudinal ribs 96a-96d,102 and the transverse ribs 98,100. When assembly, there are corresponding support protrusions (which may be similar to the support protrusions 70a,70b shown in FIGS. 12A and 12B, and extend the entire height of the cavity 14) which extend into the outer grooves 108a,108b,114a,114b to prevent the seal elements 90a,90b from rotating as the orientation of the rotor 126 is changed.

Referring now to FIG. 15D, the seal element 90a is shown in an unassembled view, where the seal element 90a is flat. The other seal element 90b has a similar shape, and therefore the shape of only the seal element 90a is described. It is seen in FIG. 15D that the width 116a of a first side, or top, of the seal element 90a is wider than the width 116b of a second side, or bottom, of the seal element 90a. Since both seal elements 90a,90b are similar in shape, when assembled, the seal assembly in the embodiment shown in FIGS. 15A-15E has a cone shape, which facilitates assembly into the housing 12. The cavity of the housing 12 also has a corresponding cone shape. The rotor 126 also has a corresponding cone shape such that the force applied to the inner sleeves 44a1,44a2 by the various beads 128a,128b,128c,128d,130 of the rotor 126 is consistent across the height and width of the seal elements 90a,90b, providing desired sealing.

Another embodiment of the present invention is shown in FIGS. 16A-16E, which is similar to the embodiment shown in FIGS. 15A-15E, with like numbers referring to like elements. However, in this embodiment, there is one seal element 120, and not two (essentially, in this embodiment, the seal elements 90a,90b are combined into one seal element). The seal element 120 has all of the same longitudinal ribs 96a-96d,102, transverse ribs 98,100, outer ribs 106a,106b,112a,112b, and outer grooves 108a,108b,114a, 114b as the two seal elements 90a,90b shown in FIGS. 15A-15E.

Figure 16B:
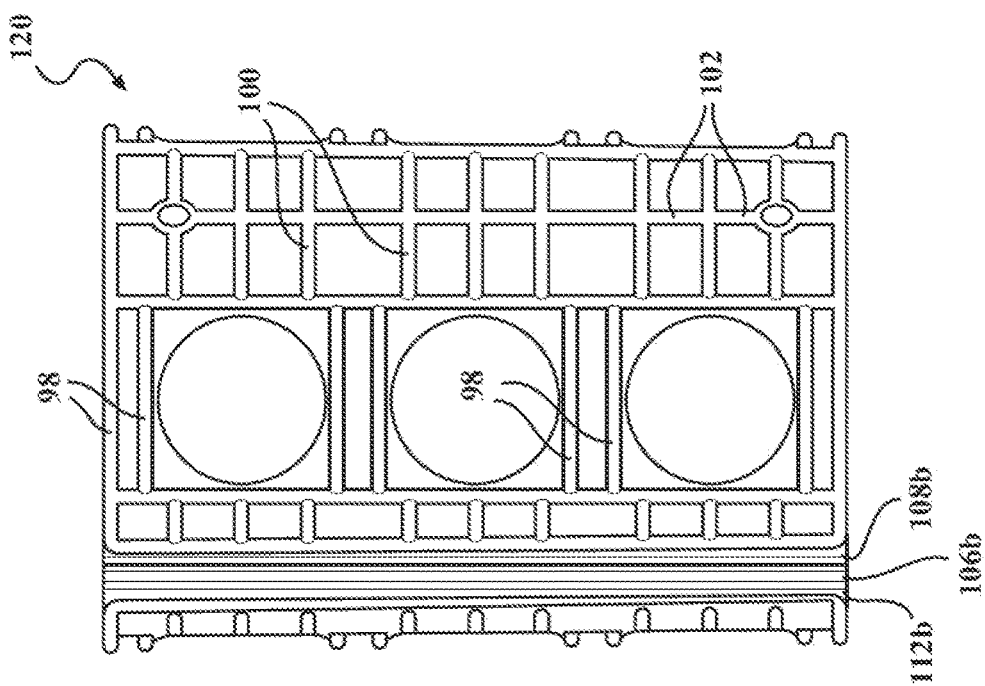
FIG. 16B is a first side view of a seal element which is part of a seventh alternate embodiment of a coolant flow control valve having a seal assembly, according to embodiments of the present invention.
Figure 16A:
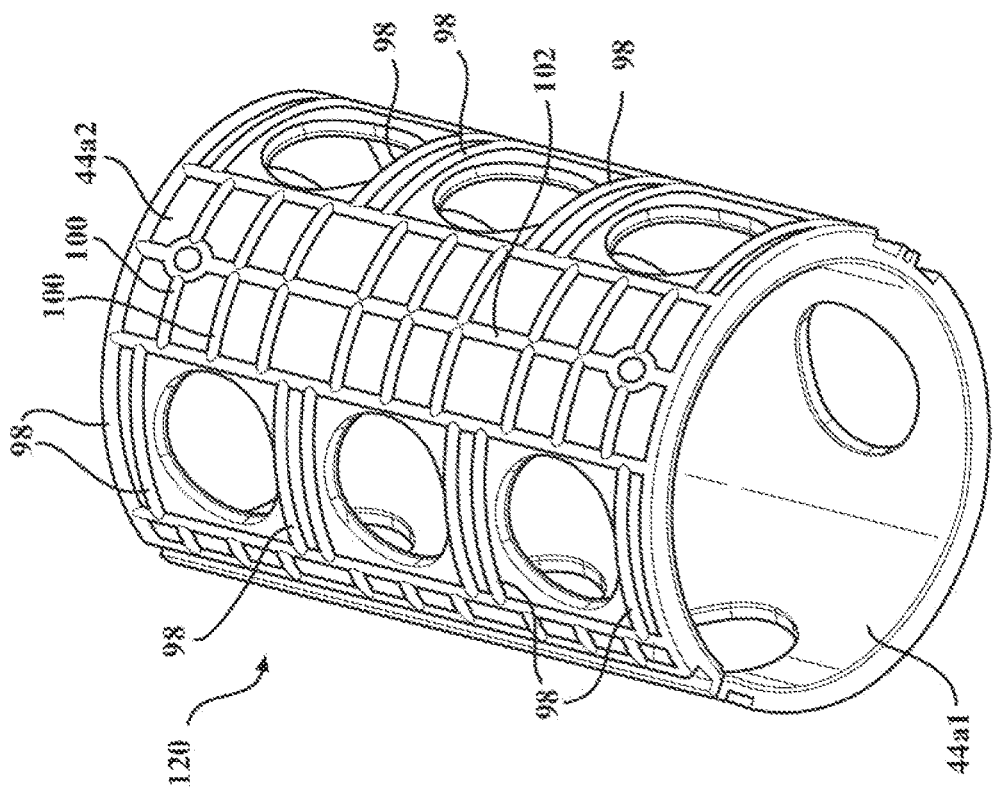
FIG. 16A is a perspective view of a seal element which is part of a seventh alternate embodiment of a coolant flow control valve having a seal assembly, according to embodiments of the present invention.
Figure 16C:
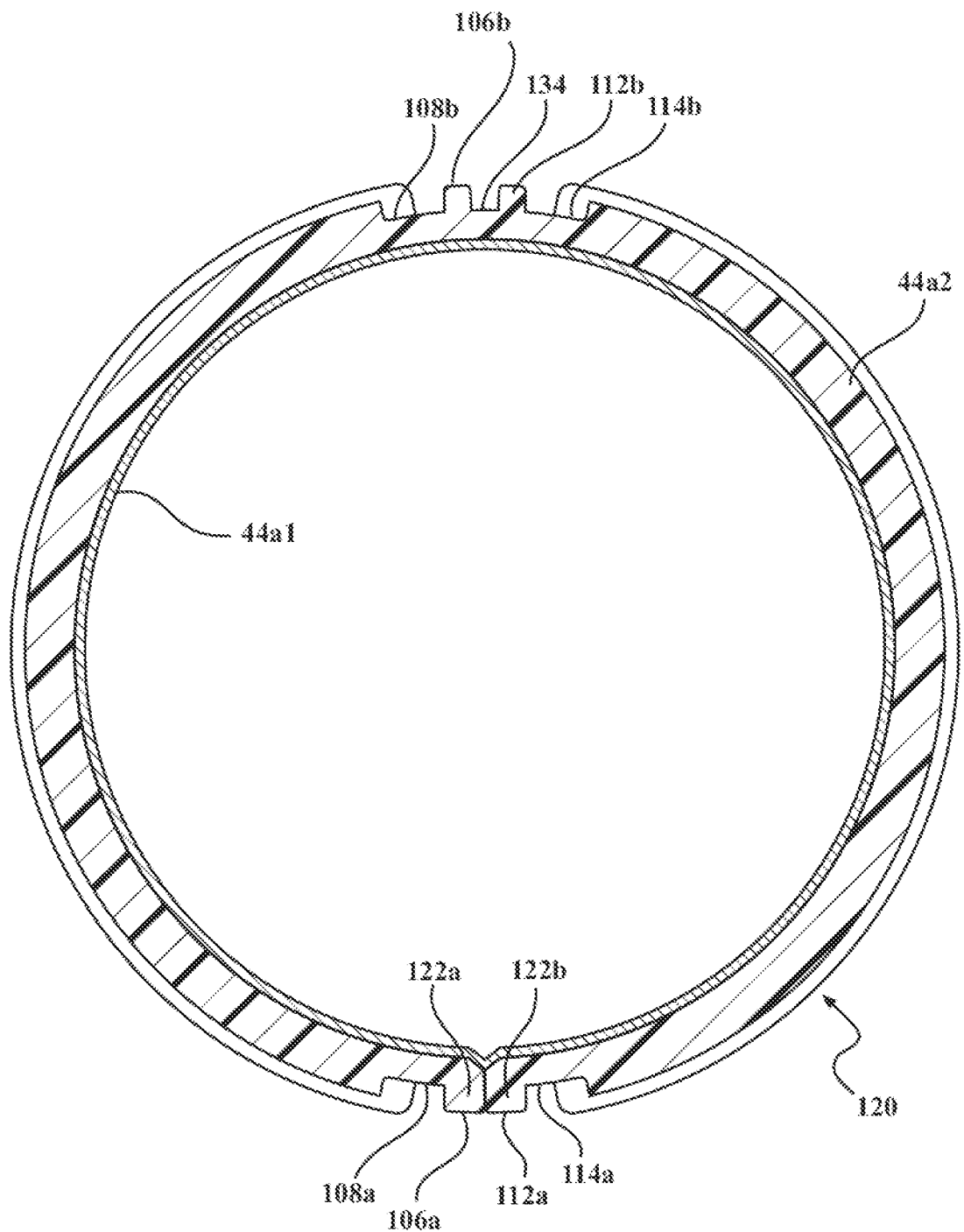
FIG. 16C is a top view of a seal element which is part of a seventh alternate embodiment of a coolant flow control valve having a seal assembly, according to embodiments of the present invention.

The seal element 120 has a first end 122a and a second end 122b. The outer rib 106a and outer groove 108a are formed as part of the first end 122a, and the outer rib 112a and outer groove 114a are formed as part of the second end 122b. When assembled, the first end 122a of the seal element 120 is positioned adjacent to the second end 122b, as shown in FIG. 16C. Also shown in FIG. 16C are the outer grooves 108b,114b and the outer ribs 106b,112b. When the first end 122a is positioned adjacent to the second end 122b, as shown in FIG. 16C, the outer grooves 108b,114b and the outer ribs 106b,112b are on the opposite side of the seal element 120 in relation to the outer ribs 106a,112a and outer grooves 108a,114a.

When the seal element 120 is disposed in the housing 12, there are support protrusions (not shown) which are approximately the same height as the seal element 120, and the support protrusions extends into the outer grooves 108a, 108b,114a,114b. The support protrusions prevent rotation of the seal element 120 relative to the housing 12 as the rotor 126 is rotated.

Figure 16D:
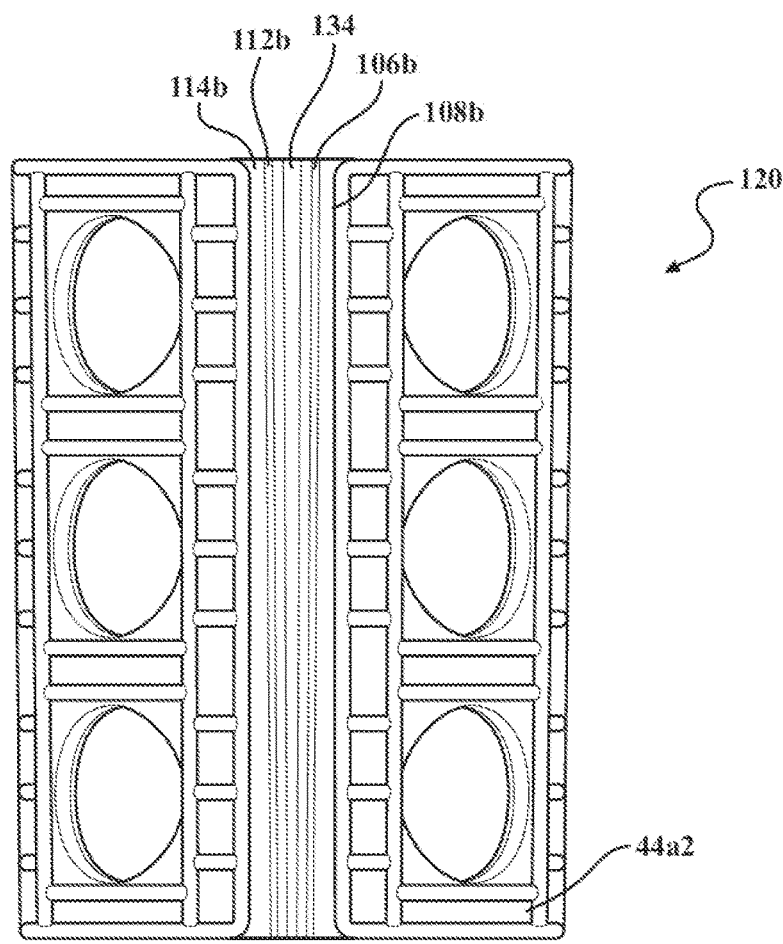
FIG. 16D is a second side view of a seal element which is part of a seventh alternate embodiment of a coolant flow control valve having a seal assembly, according to embodiments of the present invention.
Figure 16E:
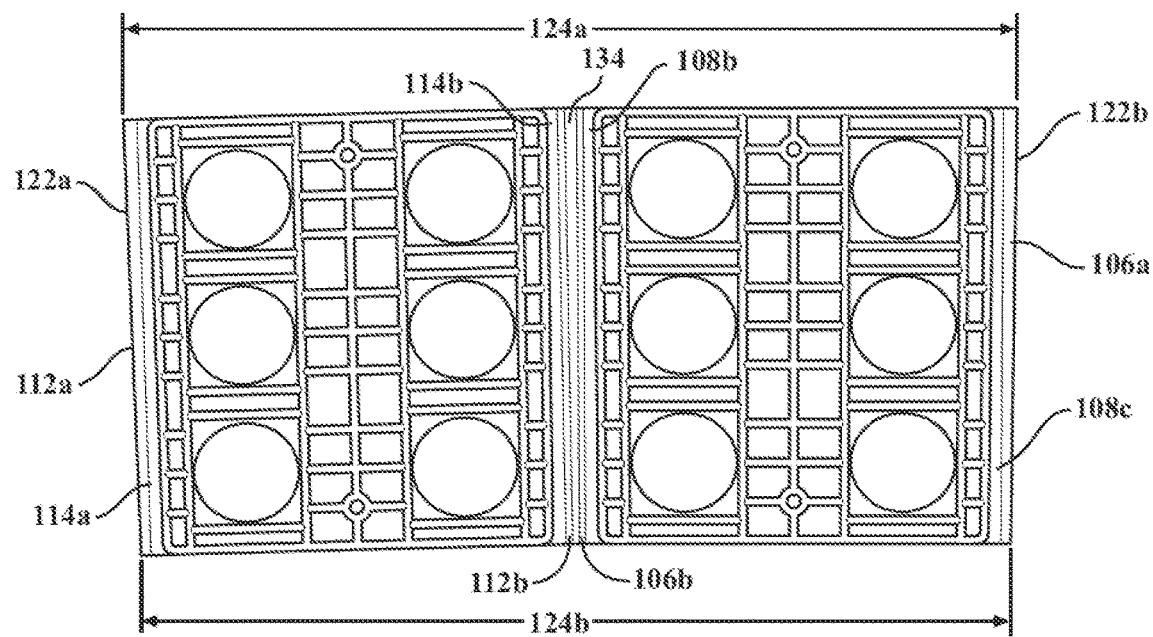
FIG. 16E is a side view of a seal element, in a flattened position, which is part of a seventh alternate embodiment of a coolant flow control valve having a seal assembly, according to embodiments of the present invention.

Referring now to FIG. 16E, the seal element 120 is shown in an unassembled view, where the seal element 120 is flat. In a similar manner to the previous embodiment, it is seen in FIG. 16E that the width 124a of a first side, or top, of the seal element 120 is wider than the width 124b of a second side, or bottom, of the seal element 120. When assembled, the seal element 120 in the embodiment shown in FIGS. 16A-16E has a cone shape, which facilitates assembly into the housing 12. As with the previous embodiment, the cavity of the housing 12 also has a corresponding cone shape, and the rotor 126 also has a corresponding cone shape such that the force applied to the inner sleeve 44a1 by the various beads 128a,128b,128c,128d,130 of the rotor 126 is consistent across the height and width of the seal element 120, providing desired sealing.

Referring again to FIG. 16C, in between the outer ribs 106b,112b is another groove 134, where the groove 134 is formed as a result of material from the seal element 120 (the outer sleeve 44b1) being removed. This results in the seal element 120 having increased flexibility, and facilitates the seal element 120 being placed in the position shown in FIG. 16C. The groove 134 also facilitates the seal element 120 having the cone shape, where it is seen in FIGS. 16D-16E that the width of the groove 134 decreases from the top of the seal element 120 to the bottom of the seal element, such that the ribs 106b,112b may have the proper spacing.

In an embodiment, the inner sleeves 44a1,44a2 of the seal elements 90a,90b and the inner sleeve 44a1 of the seal element 120 are made of a Polytetrafluoroethylene (PTFE) material which is suitable for achieving the desired level of friction between the beads 128a,128b,128c,128d,130 and the inner surface of each of the inner sleeves 44a1,44a2, while still providing desired sealing, but it is within the scope of the invention that other materials may be used. Also, the outer sleeves 44b1,44b2 of each seal element 90a,90b and the outer sleeve 44b1 of the seal element 120 is made of an ethylene propylene diene monomer rubber (EPDM) material, to provide the desired sealing, but it is within the scope of the invention that other materials may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a seal assembly for a multi-port valve assembly, the seal assembly including:
   a plurality of beads integrally formed as part of a rotor;
   at least one seal element in sliding contact with one or more of the plurality of beads; and
   at least one lip seal integrally formed as part of the at least one seal element, the at least one seal element further comprising:
   a circumferential lip seal located along an outer periphery of the at least one seal element, and the force applied to the at least one seal element by the plurality of beads is also applied to the circumferential lip seal when the rotor is in one of a plurality of orientations;
   wherein one or more of the plurality of beads applies force to the at least one seal element, such that the force is transferred to the at least one lip seal.

2. The apparatus of claim 1, the at least one lip seal further comprising:
   at least one circular lip seal circumscribing an aperture integrally formed as part of the at least one seal element;
   wherein the force applied to the at least one seal element by the at least one bead is also applied to the at least one circular lip seal when the rotor is in one of a plurality of orientations.

3. The apparatus of claim 2, the at least one lip seal further comprising:
   at least one quadrant lip seal circumscribing the at least one circular lip seal;
   wherein the force applied to the at least one seal element by the plurality of beads is also applied to the at least one quadrant lip seal when the rotor is in one of a plurality of orientations.

4. The apparatus of claim 1, the plurality of beads further comprising:
   at least one circumferential bead which circumscribes the rotor;
   wherein the at least one circumferential bead continuously applies force to the at least one seal element when the rotor is in each of a plurality of orientations.

5. The apparatus of claim 1, the plurality of beads further comprising:
   at least one tangential bead extending along an outer surface of the rotor;
   wherein the at least one tangential bead applies force to the at least one seal element when the rotor is in one of a plurality of orientations.

6. The apparatus of claim 5, the at least one tangential bead further comprising;
   a plurality of tangential beads;
   wherein a first two of the plurality of tangential beads have a first circumferential spacing, and a second two of the plurality of tangential beads have a second circumferential spacing.

7. The apparatus of claim 1, the at least one seal element further comprising;
   an inner sleeve having at least one aperture, each of the plurality of beads in contact with the inner sleeve; and
   an outer sleeve connected to the inner sleeve, and the outer sleeve having at least one aperture aligned with the at least one aperture of the inner sleeve;

wherein the at least one lip seal is formed as part of the outer sleeve.

8. The apparatus of claim 1, further comprising:
a plane extending through the rotor;
a first level on one side of the plane; and
a second level on the opposite side of the plane in relation to the first level;
wherein a portion of the plurality of beads is integrally formed as a part of the rotor which is located on the first level, and a portion of the plurality of beads is integrally formed as a part of the rotor which is located on the second level.

9. The apparatus of claim 8, the plurality of beads further comprising:
at least one circumferential bead located in the plane; and
a plurality of tangential beads integrally formed with the at least one circumferential bead;
wherein a portion of the plurality of tangential beads are integrally formed as a part of the rotor which is located on the first level, and a portion of the plurality of tangential beads are integrally formed as a part of the rotor which is located on the second level.

10. The apparatus of claim 8, wherein a portion of the at least one seal element is located in the first level, and another portion of the at least one seal element is located in the second level.

11. The apparatus of claim 8, the at least one seal element further comprising a plurality of seal elements, wherein one of the plurality of seal elements is located in the first level, and another of the plurality of seal elements is located in the second level.

12. A seal assembly for a multi-port valve assembly, the seal assembly comprising:
a plurality of beads integrally formed as part of a rotor;
at least one seal element in sliding contact with one or more of the plurality of beads; and
at least one outer rib integrally formed as part of the at least one seal element;
at least one longitudinal rib integrally formed as part of the at least one seal element;
at least one transverse rib, the at least one transverse rib integrally formed as part of the at least one seal element, and the at least one transverse rib is integrally formed with the at least one longitudinal rib, and when the at least one seal element surrounds the rotor, the rotor applies force to the at least one seal element, such that the force is transferred to the at least one transverse rib;
wherein the at least one seal element circumscribes the rotor such that one or more of the plurality of beads applies force to the at least one seal element, such that the force is transferred to the at least one outer rib and the at least one longitudinal rib.

13. The seal assembly for a multi-port valve assembly of claim 12, the at least one seal element further comprising:
a first end;
a second end;
the at least one outer rib further comprising:
an outer rib integrally formed as part of the first end of the at least one seal element; and
an outer rib integrally formed as part of the second end of the at least one seal element;
wherein the at least one seal element circumscribes the rotor such that the first end is in contact with the second end, and the outer rib of the first end is adjacent the outer rib of the second end.

14. The seal assembly for a multi-port valve assembly of claim 12, the least one seal element further comprising:
at least one outer groove;
wherein the at least one outer groove is adjacent the at least one outer rib.

15. The seal assembly for a multi-port valve assembly of claim 12, wherein the width of a first side of the at least one seal element is wider than the width of a second side of the at least one seal element such that the at least one seal element is cone shaped, and the rotor is correspondingly cone-shaped, and when the at least one seal element and the rotor are assembled together, the at least one seal element circumscribes the rotor and the force applied to the at least one seal element by the plurality of beads is consistent across the height and width of the at least one seal element.

16. The seal assembly for a multi-port valve assembly of claim 12, wherein the at least one longitudinal rib and the at least one outer rib extend the entire height of the at least one seal element.

17. The seal assembly for a multi-port valve assembly of claim 12, the at least one seal element further comprising:
at least one aperture;
wherein the at least one outer rib and the at least one longitudinal rib are adjacent the at least one aperture.

18. The seal assembly for a multi-port valve assembly of claim 17, the at least one seal element further comprising:
an inner sleeve, each of the plurality of beads in contact with the inner sleeve; and
an outer sleeve connected to the inner sleeve, the at least one outer rib formed as part of the outer sleeve;
wherein the at least one aperture further comprises a plurality of apertures, and the inner sleeve is connected to the outer sleeve such that a first of the plurality of apertures formed as part of the inner sleeve is aligned with a second of the plurality of apertures formed as part of the outer sleeve.

19. The seal assembly for a multi-port valve assembly of claim 12, the plurality of beads further comprising:
at least one circumferential bead which circumscribes the rotor; and
a plurality of tangential beads, each of which is perpendicular to the at least one circumferential bead;
wherein the at least one circumferential bead continuously applies force to the at least one seal element when the rotor is in each of a plurality of orientations, one or more of the plurality of tangential beads applies force to the at least one seal element when the rotor is in each of the plurality of orientations.

20. The seal assembly for a multi-port valve assembly of claim 19, wherein a first two of the plurality of tangential beads have a first circumferential spacing, and a second two of the plurality of tangential beads have a second circumferential spacing.

21. A seal assembly for a multi-port valve assembly, the seal assembly comprising:
a plurality of beads integrally formed as part of a rotor;
at least one seal element in sliding contact with one or more of the plurality of beads, the at least one seal element further comprising:
a first seal element having a first end and a second end; and
a second seal element having a first end and a second end;
at least one outer rib integrally formed as part of the at least one seal element;
at least one longitudinal rib integrally formed as part of the at least one seal element, and the at least one seal element circumscribes the rotor such that one or more of the plurality of beads applies force to the at least one seal element, such that the force is transferred to the at least one outer rib and the at least one longitudinal rib;

wherein the first seal element and the second seal element surround the rotor when the first end of the first seal element is adjacent the first end of the second seal element, and the second end of the first seal element is adjacent the second end of the second seal element.

22. The seal assembly for a multi-port valve assembly of claim 21, the at least one outer rib further comprising:
   a first outer rib integrally formed as part of the first end of the first seal element;
   a second outer rib integrally formed as part of the second end of the first seal element;
   a third outer rib integrally formed as part of the first end of the second seal element;
   a fourth outer rib integrally formed as part of the second end of the second seal element; and
   wherein the first outer rib is adjacent the third outer rib when the first end (104*a*) of the first seal element is adjacent the first end of the second seal element, and the second outer rib is adjacent the fourth outer rib when the second end of the first seal element is adjacent the second end of the second seal element.

23. The seal assembly for a multi-port valve assembly of claim 22, further comprising:
   a first outer groove integrally formed as part of the first seal element such that the first outer groove is adjacent the first outer rib;
   a second outer groove integrally formed as part of the first seal element such that the second outer groove is adjacent the second outer rib;
   a third outer groove integrally formed as part of the second seal element such that the third outer groove is adjacent the third outer rib;
   a fourth outer groove integrally formed as part of the second seal element such that the fourth outer groove is adjacent the fourth outer rib.

24. The seal assembly for a multi-port valve assembly of claim 23, further comprising
   a first inner sleeve being part of the first seal element, one or more of the plurality of beads in contact with the first inner sleeve;
   a first outer sleeve being part of the first seal element and connected to the first inner sleeve;
   a second inner sleeve being part of the second seal element, one or more of the plurality of beads in contact with the second inner sleeve; and
   a second outer sleeve being part of the second seal element and connected to the second inner sleeve;
   wherein the first outer rib, the second outer rib, the first outer groove, and the second outer groove are formed as part of the first outer sleeve, and the third outer rib, the fourth outer rib, the third outer groove, and the fourth outer groove are formed as part of the second outer sleeve.

25. The seal assembly for a multi-port valve assembly of claim 24, further comprising:
   a first plurality of apertures, a portion of the first plurality of apertures being part of the first inner sleeve, and another portion of the first plurality of apertures being part of the second inner sleeve; and
   a second plurality of apertures, a portion of the second plurality of apertures being part of the second inner sleeve, and another portion of the second plurality of apertures being part of the second outer sleeve;
   wherein one of the first plurality of apertures formed as part of the first inner sleeve is aligned with one of the second plurality of apertures formed as part of the first outer sleeve, and another the first plurality of apertures formed as part of the second inner sleeve is aligned with one of the second plurality of apertures formed as part of the second outer sleeve.

26. The seal assembly for a multi-port valve assembly of claim 21, the at least one longitudinal rib further comprising:
   a plurality of longitudinal ribs, a first of the plurality of longitudinal ribs integrally formed as part of the first seal element, a second of the plurality of longitudinal ribs integrally formed as part of the second seal element;
   wherein when the first seal element and the second seal element surround the rotor, the rotor applies force to the at least one seal element, such that the force is transferred to one or more of the plurality of longitudinal ribs.

27. The seal assembly for a multi-port valve assembly of claim 26, further comprising:
   a plurality of transverse ribs, a first of the plurality of transverse ribs integrally formed as part of the first seal element, a second of the plurality of transverse ribs integrally formed as part of the second seal element;
   wherein at least one of the plurality of transverse ribs is integrally formed with at least one of the plurality of longitudinal ribs, and when the first seal element and the second seal element surround the rotor, the rotor applies force to the first seal element and the second seal element, such that the force is transferred to one or more of the plurality of transverse ribs.

28. The seal assembly for a multi-port valve assembly of claim 21, wherein the width of a first side of the first seal element is wider than the width of a second side of the first seal element, and the width of a first side of the second seal element is wider than the width of a second side of the second seal element, such that when the first seal element and the second seal element are assembled, the first seal element and the second seal element are cone shaped.

29. The seal assembly for a multi-port valve assembly of claim 28, wherein the rotor is correspondingly cone-shaped such that when the first seal element, the second seal element, and the rotor are assembled together, the force applied to the first seal element and the second seal element by the beads of the rotor is consistent across the height and width of the first seal element and the second seal element.

30. The seal assembly for a multi-port valve assembly of claim 21, the plurality of beads further comprising:
   at least one circumferential bead which circumscribes the rotor;
   a plurality of tangential beads, each of which is perpendicular to the at least one circumferential bead;
   wherein the at least one circumferential bead continuously applies force to the first seal element and the second seal element when the rotor is in each of a plurality of orientations, one or more of the plurality of tangential beads applies force to the first seal element and the second seal element when the rotor is in each of the plurality of orientations.

31. The apparatus of claim 30, wherein a first two of the plurality of tangential beads have a first circumferential spacing, and a second two of the plurality of tangential beads have a second circumferential spacing.

* * * * *